(12) United States Patent
Richards et al.

(10) Patent No.: US 11,281,164 B1
(45) Date of Patent: Mar. 22, 2022

(54) TIMER VISUALIZATION

(71) Applicant: Amazon Technologies, Inc., Seattle, WA (US)

(72) Inventors: Michael Lawrence Richards, Seattle, WA (US); David Edward Bliss, Seattle, WA (US); Eric Alan Breitbard, Oakland, CA (US)

(73) Assignee: Amazon Technologies, Inc., Seattle, WA (US)

( * ) Notice: Subject to any disclaimer, the term of this patent is extended or adjusted under 35 U.S.C. 154(b) by 158 days.

(21) Appl. No.: 15/874,716

(22) Filed: Jan. 18, 2018

(51) Int. Cl.
*G04F 3/08* (2006.01)
*G10L 15/22* (2006.01)
*G04G 9/00* (2006.01)
*G04G 21/06* (2010.01)

(52) U.S. Cl.
CPC ............... *G04F 3/08* (2013.01); *G04G 9/00* (2013.01); *G04G 21/06* (2013.01); *G10L 15/22* (2013.01); *G10L 2015/223* (2013.01)

(58) Field of Classification Search
CPC ......... G04B 19/048; G04C 19/00; G04F 3/08; G04G 9/00; G04G 21/06
See application file for complete search history.

(56) References Cited

U.S. PATENT DOCUMENTS

| | | | | |
|---|---|---|---|---|
| 5,602,963 A * | 2/1997 | Bissonnette | ......... | H04M 1/271 |
| | | | | 379/88.01 |
| 5,694,376 A * | 12/1997 | Sullivan | ................... | G04G 9/02 |
| | | | | 368/240 |
| 6,388,952 B2 * | 5/2002 | Kim | ..................... | G04G 9/0082 |
| | | | | 340/309.4 |
| 2010/0157742 A1 * | 6/2010 | Relyea | ................ | G04G 9/0082 |
| | | | | 368/28 |
| 2012/0303140 A1 * | 11/2012 | Cox | ........................ | G05B 15/02 |
| | | | | 700/17 |
| 2013/0116967 A1 * | 5/2013 | Akcasu | .................... | G04G 9/00 |
| | | | | 702/150 |
| 2014/0337028 A1 * | 11/2014 | Wang | ................ | H04M 1/72436 |
| | | | | 704/251 |
| 2016/0306442 A1 * | 10/2016 | Lee | ........................ | G06F 3/0362 |
| 2016/0313869 A1 * | 10/2016 | Jang | ........................ | G04G 9/00 |
| 2016/0378067 A1 * | 12/2016 | Bishop | ....................... | G04F 3/06 |
| | | | | 368/241 |
| 2017/0069324 A1 * | 3/2017 | Gardner | ................. | H04L 12/282 |
| 2019/0038184 A1 * | 2/2019 | Narasimhan | .......... | G06F 1/1694 |
| 2019/0067803 A1 * | 2/2019 | Kang | ...................... | H01Q 1/273 |

FOREIGN PATENT DOCUMENTS

WO   WO-2007119935 A1 * 10/2007 ............... G04F 3/08

\* cited by examiner

*Primary Examiner* — Daniel P Wicklund
(74) *Attorney, Agent, or Firm* — Lee & Hayes, P.C.

(57) ABSTRACT

Systems and methods for timer visualization are disclosed. A device, such as a voice-controlled device, may not have means of visually displaying a timer and/or the progression of a timer. The device may send timer data to an accessory device, which may be configured to provide one or more visual indications of the timer set via the device as well as the progression of the timer. Multiple timers may be sent and differing visual indications may be displayed to show the multiple timers and/or attributes associated with the timers, such as the location of the device in an environment, the user profile associated with the setting of the timer, and/or the state of the device.

20 Claims, 14 Drawing Sheets

TIMER VISUALIZATION

BACKGROUND

Clocks have been used to display time and set timers. A user of these clocks can set the time and may be able to set a timer using mechanical inputs on the clock. Described herein are improvements in technology and solutions to technical problems that can be used to, among other things, provide a timer visualization device.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
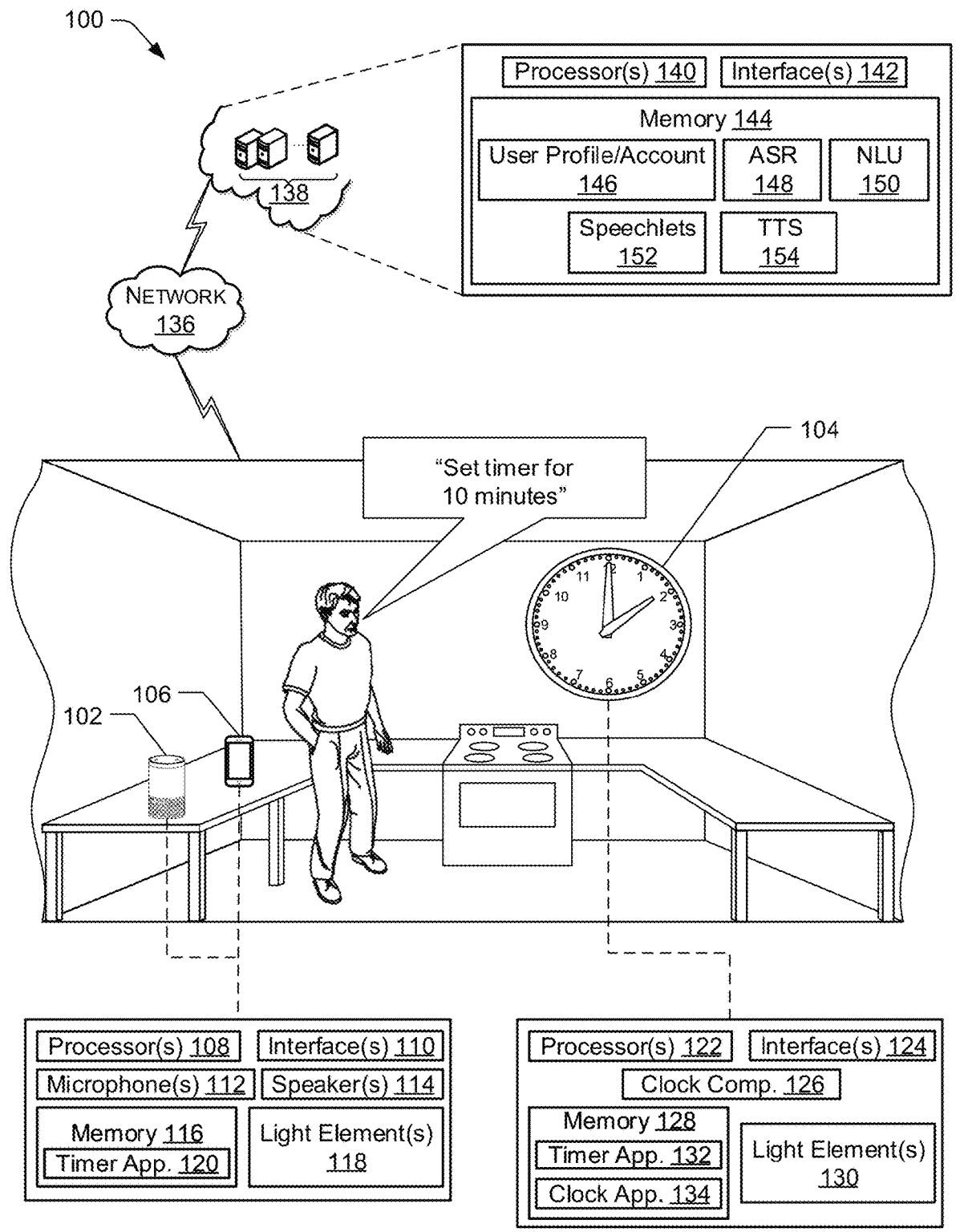
FIG. 1 illustrates a schematic diagram of an example environment for utilizing a timer visualization device.

Systems and methods for timer visualization are described herein. Take, for example, an environment, such as a home, that has a device, such as a voice-controlled device, situated therein. The device may be configured to receive user utterances from users that are near the device and to generate corresponding audio data. In examples, the user may desire to set one or more timers via user utterances. To do so, the user may say, for example, "set a timer for 10 minutes." The device may capture audio and may generate audio data representing the user utterance. The audio data may be sent to a remote system for speech processing. The remote system may determine that the user utterance corresponds to an intent to set a timer and a speechlet of the remote system may generate directive data indicating a directive for the device to set a timer for, in this example, 10 minutes.

The device may have a timer application located in memory of the device and may utilize the timer application to set the 10-minute timer. The timer application may keep track of the progress of the timer during the time period in which the timer is set. Additionally, in examples, the remote system may send audio data representing synthesized and/or prerecorded speech to the device with instructions for the device to output audio, via one or more speakers, corresponding to the audio data. The audio may provide a confirmatory message to the user that the timer has been set, such as "10-minute timer, starting now." The user may also desire to hear an audible update on the status of the timer. In these situations, the user speaks another user utterance representing a query for the status of the timer. The device may, in response to the query, output audio representing a response indicating, for example, a remaining amount of time associated with the timer.

To improve existing technology, the present disclosure describes systems and methods for timer visualization utilizing an accessory device in communication with the device. For example, the accessory device may be a clock, such as a wall clock, a physical timer, such as an egg timer, a device having a digital display, and/or one or more devices capable of presenting the tracking of time and/or the passage of time. In examples, the accessory device may be situated in an environment in which the device is situated. The accessory device may include components of a clock or timer, such as a minute hand, an hour hand, a second hand, numerical indicators of hours, such as the numbers 1-12, indicators of minutes and/or seconds, such as demarcations between the numerical indicators, and/or components that move the minute hand, the hour hand, and/or the second hand in a manner that corresponds with the passage of time. The accessory device may include one or more computing components, such as processors, network interfaces, and memory that may include a clock application configured to perform the operations of a clock and a timer application configured to set timers, track timer progression, and cause visual display of timers.

Utilizing the example provided above, the user may speak a user utterance such as "set timer for 10 minutes." Microphones of the device may capture the user utterance and generate corresponding audio data. The audio data may be sent to a remote system for processing. Directive data may be received at the device from the remote system and may represent a directive for the device to set a 10-minute timer. The device may set the 10-minute timer. Additionally, the device may send timer data to the accessory device indicating that the timer has been set and an amount of time, here 10 minutes, associated with the timer. The accessory device may utilize the timer data to cause display of an indication of the timer and its associated duration via the accessory device. For example, the accessory device may have light emitting diodes (LEDs) or other light elements associated with each of the minute demarcations. Having received the timer data indicating a timer for 10 minutes has been set, the accessory device may cause the LEDs of 10 of the minute demarcations to emit light. Using a wall clock as an example, the LEDs corresponding to the minute demarcations between the "12" demarcation and the "2" demarcation may emit light. In this way, the accessory device may cause display of the 10-minute timer. As the timer progresses, the LEDs may cease outputting light. For example, at or after the lapse of one minute of the timer, one of the LEDs, such as the LED associated with the "2" demarcation may cease outputting light. Once the amount of time associated with the timer lapses, the LEDs may cease outputting the light and/or may output light in a manner that visually indicates that the amount of time has lapsed.

In other examples, a determination may be made as to the position of the minute hand and what demarcation is associated with the position of the minute hand. For example, if the current time is 2:30, it may be determined that the minute hand is positioned such that the minute hand is pointing to the "6" demarcation. Based at least in part on the position of the minute hand, LEDs corresponding to the minute demarcations between the "6" demarcation and the "8" demarcation may emit light. In this way, the accessory device may cause display of the 10-minute timer to be 10 minutes from the current time. Additional, or alternative, means of visually presenting timers may be used. For example, instead of multiple LEDs corresponding to the number of minutes associated with the timer being utilized, one LED corresponding to the minute demarcation corresponding to the amount of time may be utilized. Additionally, or alternatively, a physical indicator of a timer may be moved to a position that indicates the amount of time. Additionally, or alternatively, a digital display may be caused to display a number corresponding to the amount of time. Additionally, or alternatively, an animatronic device may be caused to move components thereof in a manner that indicates the amount of time and/or a progression of the amount of time.

Additionally, in examples where more than one timer is set via the device, multiple visual indications corresponding to the timers may be presented via the accessory device. The visual indications may include, in examples where the accessory device utilizes light elements, differences in light intensity between the LEDs utilized for a first timer and the LEDs utilized for a second timer. Additionally, or alternatively, differences in light color between the first timer LEDs and the second timer LEDs may be utilized. Additionally, or alternatively, the accessory device may have multiple LEDs associated with each minute demarcation such that setting of multiple timers results in multiple arcs of LEDs being utilized to visualize the different timers.

A communication channel may be established between the accessory device and the device during a time period corresponding to the timer. The accessory device may receive updated timer data, such as continuously or periodically, from the device that indicates a progression of the timer. Additionally, the updated timer data may indicate that a timer has been cancelled, has expired, should be paused, and/or should be reset, for example.

Additionally, or alternatively, an environment may include multiple accessory devices disposed, for example, in different portions of the environment. For example, one accessory device may be located in a kitchen of a home, while another accessory device may be located in a bedroom. The user may set a timer in the kitchen and the kitchen accessory device may display the visual indication of the timer has described herein. The user may then move from the kitchen to the bedroom and may desire to see the visual indication of the timer on the bedroom accessory device. The timer data may be sent to the bedroom accessory device to cause the visual indication of the timer to be displayed via the bedroom accessory device. Sending the timer data to the bedroom accessory device may be based at least in part on a user request, a predefined setting, and/or inferences associated with the current location of the user. For example, a second device may be located in the bedroom and may capture audio associated with the user, such as sound from footsteps, talking, turning on a light switch, etc. Audio data corresponding to this captured audio may be analyzed to determine that the user has moved from the kitchen to the bedroom, and based at least in part on that determination, the timer data may be sent to the bedroom accessory device to present the visual indication of the timer on the bedroom accessory device.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for utilizing a timer visualization device. The system 100 may include, for example, a device 102 and an accessory device 104. The device 102 may be, for example, a voice-controlled device that may capture user utterances and perform one or more actions based at least in part on those user utterances. The accessory device 104 may be, for example, a clock, such as a wall clock, a physical timer, such as an egg timer, a device having a digital display, and/or one or more devices capable of presenting the tracking of time and/or the passage of time. The accessory device 104 will be described as a wall clock with respect to FIG. 1, but it should be understood that this embodiment of the accessory device 104 is provided herein for illustration and not as a limitation. In examples, the accessory device 104 may be situated in an environment in which the device 102 is situated. The system 100 may additionally, or alternatively, include a personal device 106, such as a mobile phone. As used herein, the term "environment" means a given area. Non-limiting examples of environments may be, for example, a room, a house, an office, a place of business, an apartment, and/or an outdoor space.

The device 102 may include components such as, for example, one or more processors 108, one or more network interfaces 110, one or more microphones 112, one or more speakers 114, memory 116, and/or one or more light elements 118. The memory 116 of the device 102 may include a timer application 120, which will be described in detail below. The device 102 may include all of the components described herein or only a portion of the components. The personal device 106 may include the same or similar components as the device 102 and may be perform the same or similar functions as the device 102, in examples. In examples, the personal device 104 may perform functions of the device 102 instead of the device 102.

The accessory device 104 may include components such as, for example, one or more processors 122, one or more network interfaces 124, one or more clock components 126, memory 128, and/or one or more light elements 130. The clock components 126 may include, for example, a minute hand, an hour hand, a second hand, numerical indicators of hours, such as the numbers 1-12, indicators of minutes and/or seconds, such as demarcations between the hour indicators, and/or components that move the minute hand, the hour hand, and/or the second hand in a manner that corresponds with the passage of time. Additionally, or alternatively, the clock components 126 may include a moveable member configured to be physically moved, such as by a user and/or by a motor, to set a timer. For example, the moveable member may be a dial that may be rotated. Additionally, or alternatively, the clock components 126 may include a display configured to present a visual indication of time. Additionally, or alternatively, the clock components 126 may include a clock face, also described as a dial, an hour hand, a second hand, a minute hand, one or more gears, also described as wheels, positioned to remote the hour hand, the second hand, and/or the minute hand, and means to rote the gears such as an electronic motor and/or a weight-and-pendulum system. The one or more light elements 130 may include, for example, LEDs. The light elements 130 may be situated with respect to a body of the accessory device 104 such that the LEDs correspond to timing demarcations of the accessory device 104. Using the wall clock accessory device 104 depicted in FIG. 1 as an example, the one or more of the LEDs may be associated with some or all of the minute demarcations and/or hour demarcations. Additionally, or alternatively, other light emitters other than LEDs may be utilized. Additionally, or alternatively, the light elements 130 may include one or more displays configured to display content instead of or in addition to emitting light.

The memory 128 of the accessory device 104 may include one or more applications. For example, the applications may include a timer application 132 and a clock application 134. While the timer application 132 and the clock application 134 are depicted as separate applications, it should be understood that the timer application 132 and the clock application 134 may be the same application. The clock application 134 may be configured to set the time on the accessory device 104, to cause presentation of time to change as seconds and/or minutes and/or hours pass, and/or to determine a position of the minute hand, the second hand, and/or the hour hand with respect to the body of the accessory device 104. The clock application 134 may be further configured to identify a current time and send data indicating the identified time to one or more other devices, such as the device 102. The timer application 132 may be configured to receive timer data from the device 102 and to cause visual presentation of an amount of time associated with one or more timers via the accessory device. The functionalities of the timer application 132 will be described in more detail below.

The device 102 may communicate with the accessory device 104 via a network 136 and/or via one or more short-range communication means, such as Bluetooth and/or Bluetooth Low Energy (BLE) and/or Bluetooth Smart. Communication between the device 102 and the accessory device 104 may be continuous and/or near continuous such that data is sent and/or received between the device 102 and the accessory device 104 continuously and/or nearly continuously. Alternatively, communication between the device 102 and the accessory device 104 may be periodic such that data is sent and/or received between the device 102 and the accessory device 104 on a periodic basis, such as every second, every fraction of a second, and/or every minute.

Additionally, the system 100 may include a remote system 138 configured to receive and send data between the remote system 138 and the device 102, for example. The remote system 138 may include components such as, for example, one or more processors 140, one or more network interfaces 142, and memory 144. The components of the memory 144 may include, for example, a user profile/account component 146, an automatic speech recognition (ASR) component 148, a natural language understanding (NLU) component 150, one or more speechlets 152, and/or a text-to-speech (TTS) component 154. The components of the memory 144 are described in detail below.

The user profiles/accounts component 146 may be configured to identify, determine, and/or generate associations between users, user profiles, user accounts, and/or devices. For example, one or more associations between personal devices 106, devices 102, accessory devices 104, environments, networks 136, users, user profiles, and/or user accounts may be identified, determined, and/or generated by the user profile/account components 146. The user profile/account component 146 may additionally store information indicating one or more applications accessible to the personal device 106 and/or the device 102 and/or the accessory device 104. It should be understood that the personal device 106 may be associated with one or more other personal devices 106, one or more devices 102, one or more accessory devices 104, one or more environments, one or more applications stored on and/or accessible by the personal device 106, and/or one or more users. It should also be understood that that a user account may be associated with one or more than one user profiles. For example, a given personal device 106, device 102, and/or accessory device 104 may be associated with a user account and/or user profile that is also associated with the devices 102 associated with an environment. The personal device 106, the device 102, the accessory device 104, the user profile, and/or the user account may be associated with one or more applications, which may have their own user profiles and/or user accounts.

The ASR component 148 may be configured to receive audio data, which may represent human speech such as user utterances, and generate text data corresponding to the audio data. The text data may include words corresponding to the human speech. The NLU component 150 may be configured to determine one or more intents associated with the human speech based at least in part on the text data. The ASR component 148 and the NLU component 150 are described in more detail below with respect to FIG. 13. For purposes of illustration, the ASR component 148 and the NLU component 150 may be utilized to determine one or more intents to set and/or control timers.

For example, a user may speak a user utterance to the device 102. The microphones 112 of the device 102 may capture the user utterance and may generate corresponding audio data. The audio data may be sent, via the network 136, to the remote system 138. The ASR component 148 may process the audio data and generate corresponding text data. The NLU component 150 may utilize the text data to determine intent data representing an intent of the user to, in these examples, set and/or control one or more timers via the device 102.

The speechlets 152 may receive the intent data from the NLU component 150 and may utilize the intent data to identify, determine, and/or generate directive data corresponding to the intent data. For example, the intent data may indicate an intent associated with the user utterance, such as a "set timer" intent. Based at least in part on this intent data, the remote system 138, such as via an orchestrator, may send the intent data or a portion thereof to a speechlet 152 configured to identify, determine, and/or generate directive data associated with setting timers. For example, as shown in FIG. 1, a user has spoken the user utterance of "set timer for 10 minutes." The microphones 112 of the device 102 may capture the user utterance and generate corresponding audio data. The audio data may be sent to the remote system 138, where the ASR component 148 may generate corresponding text data. The text data may be utilized by the NLU component 150 to generate intent data indicating that the user utterance is associated with a "set timer" intent, and a value associated with the intent is "10 minutes." The value may be described herein as the payload. The intent data may be sent to the speechlet 152, which may identify, determine, and/or generate directive data indicating that a timer is to be set via the device 102 for an amount of time of 10 minutes.

The directive data may be sent from the remote system 138 to the device 102. Based at least in part on the directive data, the timer application 120 of the device 102 may cause a timer to be set via the device 102. The timer may be set for 10 minutes. Additionally, in examples, the TTS component 154 of the memory 144 may identify, determine, and/or generate audio data corresponding to a confirmatory message that the timer has been set. This audio data may be sent to the device 102 along with, in examples, instructions for the device 102 to output audio corresponding to the audio data. Based at least in part on receiving the audio data from the remote system 138, the speakers 114 of the device 102 may output the audio. The audio may include the confirmatory message, which may be, for example "timer set for 10-minutes."

The device 102, having set the timer, may send timer data to the accessory device 104. In examples, the device 102 may identify, determine, and/or generate the timer data. Alternatively, the remote system 138 may send the timer data to the accessory device 104. In these examples, the remote system 138 may identify, determine, and/or generate the timer data add may send the timer data to the accessory device 104, which may be sent directly to the accessory device 104 or via the device 102. The accessory device 104 may receive the timer data, and the timer application 132 of the accessory device 104 may utilize the timer data to cause a visual indication of the timer to be displayed and its associated duration via the accessory device 104. For example, the accessory device 104 may have light emitting diodes (LEDs) or other light elements 130 associated with each of the minute demarcations. Having received the timer data indicating a timer for 10 minutes has been set, the accessory device 104 may cause the LEDs of 10 of the minute demarcations to emit light. Using the wall clock as an example, the LEDs corresponding to the minute demarcations between the "12" demarcation and the "2" demarcation may emit light. In this way, the accessory device 104 may cause display of the 10-minute timer. As the timer progresses, the LEDs may cease outputting light. For example, at or after the lapse of one minute of the timer, one of the LEDs, such as the LED associated with the "2" demarcation may cease outputting light. Once the amount of time associated with the timer lapses, the LEDs may cease outputting the light and/or may output light in a manner that visually indicates that the amount of time has lapsed. In other examples, one or more visual representations may be displayed to indicate that the amount of time is nearing its end and/or that the amount of time has lapsed. For example, the accessory device 104 may include a display, such as a liquid crystal display (LCD), that may present one or more images. For example, the LCD may turn a certain color, such as red, when the amount of time has lapsed. Other visualizations may include animations of the passage of time, such as an animation of sand filling up the display or emptying from the display as time passes.

In other examples, a determination may be made as to the position of the minute hand and what demarcation is associated with the position of the minute hand. This determination may be made using, for example, the clock application 134 and/or the timer application 132. For example, if the current time is 2:30, it may be determined that the minute hand is positioned such that the minute hand is pointing to the "6" demarcation. Based at least in part on the position of the minute hand, LEDs corresponding to the minute demarcations between the "6" demarcation and the "8" demarcation may emit light. In this way, the accessory device 104 may cause display of the 10-minute timer to be 10 minutes from the current time. Additional, or alternative, means of visually presenting timers may be used. For example, instead of multiple LEDs corresponding to the number of minutes associated with the timer being utilized, one LED corresponding to the minute demarcation of the amount of time for the timer may be utilized. Additionally, or alternatively, a physical indicator of a timer may be moved to a position that indicates the amount of time. Additionally, or alternatively, a digital display may be caused to display a number corresponding to the amount of time. Additionally, or alternatively, an animatronic device may be caused to move components thereof in a manner that indicates the amount of time and/or a progression of the amount of time.

Additionally, in examples where more than one timer is set via the device 102, multiple visual indications corresponding to the timers may be presented via the accessory device 104. The visual indications may include, in examples where the accessory device 104 utilizes light elements 130, differences in light intensity between the LEDs utilized for a first timer and the LEDs utilized for a second timer may be used. Additionally, or alternatively, differences in light color between the first timer LEDs and the second timer LEDs may be utilized. Additionally, or alternatively, the accessory device 104 may have multiple LEDs associated with each minute demarcation such that setting of multiple timers results in multiple arcs of LEDs being utilized to visualize the different timers.

A communication channel may be established between the accessory device 104 and the device 102 during a time period corresponding to the timer. The accessory device 104 may receive updated timer data, such as continuously or periodically, from the device 102 that indicates a progression of the timer. Additionally, the updated timer data may indicate that a timer has been cancelled, has expired, should be paused, and/or should be reset, for example.

Additionally, or alternatively, an environment may include multiple accessory devices 104 disposed, for example, in different portions of the environment. For example, one accessory device 104 may be located in a kitchen of a home, while another accessory device 104 may be located in a bedroom. The user may set a timer in the kitchen and the kitchen accessory device 104 may display the visual indication of the timer has described herein. The user may then move from the kitchen to the bedroom and may desire to see the visual indication of the timer on the bedroom accessory device 104. The timer data may be sent to the bedroom accessory device 104 to cause the visual indication of the timer to be displayed via the bedroom accessory device 104. Sending the timer data to the bedroom accessory device 104 may be based at least in part on a user request, a predefined setting, and/or inferences associated with the current location of the user. For example, a second device 102 may be located in the bedroom and may capture audio associated with the user, such as sound from footsteps, talking, turning on a light switch, etc. Audio data corresponding to this captured audio may be analyzed to determine that the user has moved from the kitchen to the bedroom, and based at least in part on that determination, the timer data may be sent to the bedroom accessory device 104 to present the visual indication of the timer on the bedroom accessory device 104.

As used herein, a processor, such as processor(s) 108, 122, and/or 140, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108, 122, and/or 140 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108, 122, and/or 140 may possess its own local memory, which also may store program components, program data, and/or one or more operating systems.

The memory 116, 128, and/or 144 may include volatile and nonvolatile memory, removable and non-removable media implemented in any method or technology for storage of information, such as computer-readable instructions, data structures, program component, or other data. Such memory 116, 128, and/or 144 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 116, 128, and/or 144 may be implemented as computer-readable storage media ("CRSM"), which may be any available physical media accessible by the processor(s) 108, 122, and/or 140 to execute instructions stored on the memory 116, 128, and/or 144. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 116, 128, and/or 144, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 110, 124, and/or 142 may enable communications between the components and/or devices shown in system 100 and/or with one or more other remote systems, as well as other networked devices. Such network interface(s) 110, 124, and/or 142 may include one or more network interface controllers (NICs) or other types of transceiver devices to send and receive communications over the network 136.

For instance, each of the network interface(s) 110, 124, and/or 142 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 110, 124, and/or 142 may include a wide area network (WAN) component to enable communication over a wide area network.

In some instances, the remote system 138 may be local to an environment associated the personal device 106 and/or one or more of the devices 102 and/or one or more of the accessory devices 104. For instance, the remote system 138 may be located within the personal device 106 and/or one or more of the devices 102 and/or one or more of the accessory devices 104. In some instances, some or all of the functionality of the remote system 138 may be performed by one or more of the personal device 106 and/or one or more of the devices 102 and/or one or more of the accessory devices 104.

Figure 2:
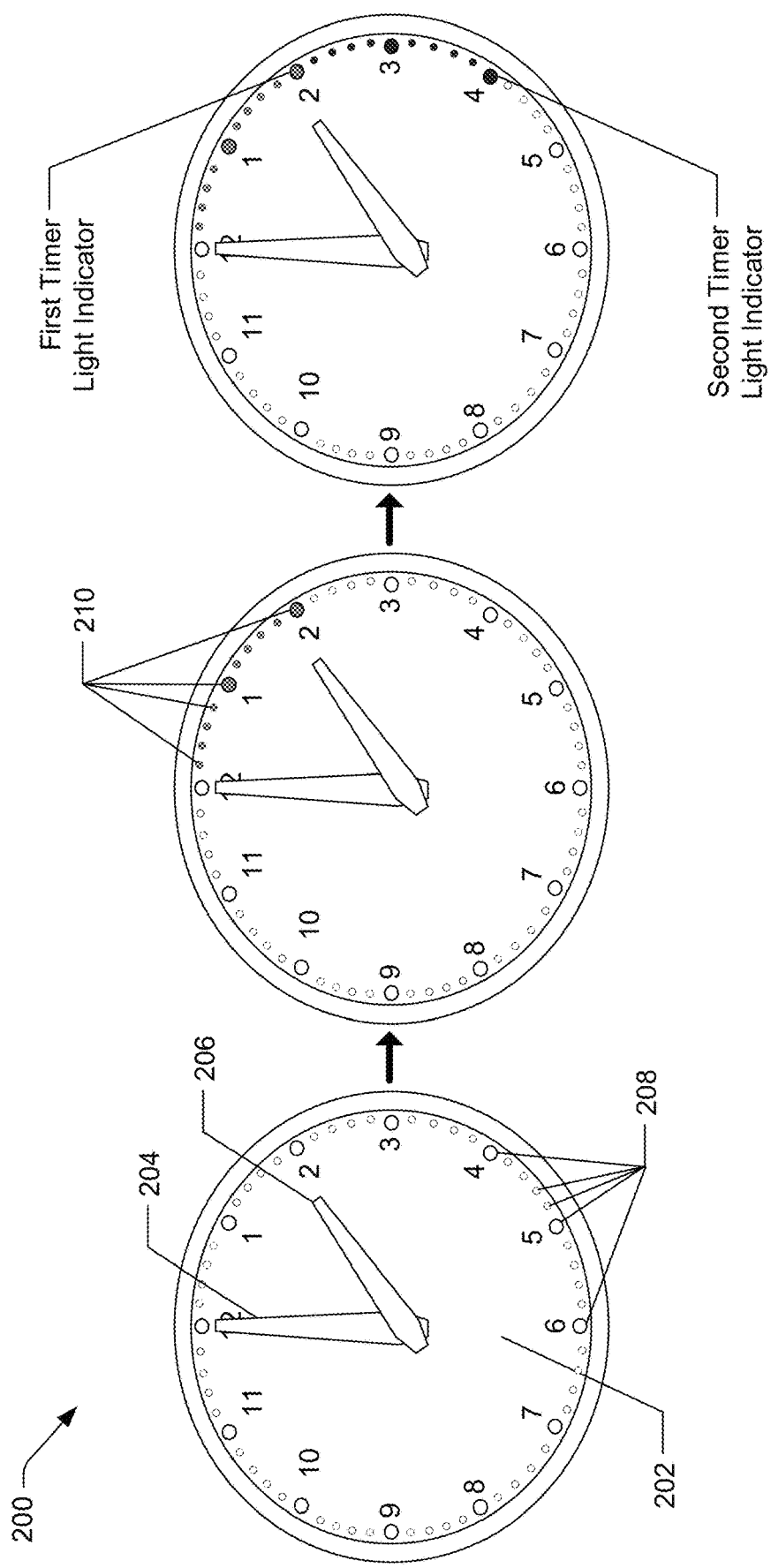
FIG. 2 illustrates an example timer visualization device depicting indications of multiple timers that have been set.

FIG. 2 illustrates an example accessory device 200 depicting indications of multiple timers that have been set. FIG. 2 depicts a progression, from left to right, of display of timers on an accessory device 200. The accessory device 200 may have the same or similar components as the accessory device 104 from FIG. 1. Additionally, the accessory device 200 may be configured to perform the same or similar operations as the accessory device 100 from FIG. 1. For example, the accessory device 200 may include a body member 202, a minute hand 204, an hour hand 206, a second hand (not shown), and one or more time indicators 208. The time indicators 208 may include indicators of hours, such as the numbers 1-12, indicators of minutes and/or seconds, such as indicators between the hour indicators.

The accessory device 200 may include additional components such as, for example, one or more processors, one or more network interfaces, one or more clock components, memory, and/or one or more light elements. Additionally, or alternatively, the clock components 126 may include a moveable member configured to be physically moved, such as by a user and/or by a motor, to set a timer. For example, the moveable member may be a dial that may be rotated. Additionally, or alternatively, the clock components may include a display configured to present a visual indication of time.

The accessory device 200 may additionally include one or more light elements 210, which may include, for example, LEDs. The light elements 210 may be situated with respect to the body member 202 of the accessory device 200 such that the light elements 210 correspond to some or all of time indicators 208 of the accessory device 200. Using the wall clock accessory device 200 depicted in FIG. 2 as an example, the light elements 210 may be associated with some or all of the minute indicators and/or hour indicators of the time indicators 208. Additionally, or alternatively, the light elements 210 may include one or more displays configured to display content instead of or in addition to emitting light.

As shown in the left-most depiction of the accessory device 200 in FIG. 2, the light elements 210 may not emit light or may emit light at the same or substantially the same intensity and/or color when a timer has not been set by a device and/or a remote system. A user may then speak a user utterance to the device. The microphones of the device may capture the user utterance and may generate corresponding audio data. The audio data may be sent, via a network, to a remote system. An ASR component of the remote system may process the audio data and generate corresponding text data. A NLU component of the remote system may utilize the text data to determine intent data representing an intent of the user to, in these examples, set and/or control one or more timers via the device.

One or more speechlets of the remote system may receive the intent data from the NLU component and may utilize the intent data to identify, determine, and/or generate directive data corresponding to the intent data. For example, the intent data may indicate an intent associated with the user utterance, such as a "set timer" intent. Based at least in part on this intent data, the remote system, such as via an orchestrator, may send the intent data or a portion thereof to a speechlet configured to identify, determine, and/or generate directive data associated with setting timers. As shown in FIG. 2, the directive data may indicate that a timer is to be set via the device for an amount of time of 10 minutes.

The directive data may be sent from the remote system to the device. Based at least in part on the directive data, a timer application of the device may cause a timer to be set via the device. The timer may be set for 10 minutes in this example. The device, having set the timer, may send timer data to the accessory device 200. In examples, the device may identify, determine, and/or generate the timer data. In other examples, the remote system may identify, determine, and/or generate the timer data add may send the timer data to the accessory device 200, such as via the device. The accessory device 200 may receive the timer data, and a timer application of the accessory device 200 may utilize the timer data to cause a visual indication of the timer to be displayed and its associated duration via the accessory device 200.

For example, having received the timer data indicating a timer for 10 minutes has been set, the accessory device 200 may cause the light elements 210 of 10 of the time indicators 208, such as 10 of the minute indicators to emit light. Using the wall clock as an example, the light elements 210 corresponding to the minute indicators between the "12" demarcation and the "2" demarcation may emit light. This is shown in the middle depiction of the accessory device 200 in FIG. 2. In this way, the accessory device 200 may cause display of the 10-minute timer. As the timer progresses, the light elements 210 may cease outputting light. For example, at or after the lapse of one minute of the timer, one of the light emitters 210, such as the light emitter associated with the "2" demarcation may cease outputting light. Once the amount of time associated with the timer lapses, the light elements 210 may cease outputting the light and/or may output light in a manner that visually indicates that the amount of time has lapsed.

Additionally, in examples where more than one timer is set via the device, multiple visual indications corresponding to the timers may be presented via the accessory device 200. The visual indications may include, in examples where the accessory device 200 utilizes light elements 210, differences in light intensity between the light elements 210 utilized for a first timer and the light elements 210 utilized for a second timer may be used. Additionally, or alternatively, differences in light color between the first timer light elements 210 and the second timer light elements 210 may be utilized. Additionally, or alternatively, the accessory device 200 may have multiple light elements 210 associated with each time indicator 208 such that setting of multiple timers results in multiple arcs of light elements 210 being utilized to visualize the different timers. The presentation of multiple visual indications corresponding to timers is shown with respect to the right-most depiction of the accessory device 200 in FIG. 2.

For example, the user's first user utterance corresponded to a request to set a 10-minute timer. The user or another user may speak a second user utterance corresponding to a request to set a 20-minute timer. The device may send second timer data to the accessory device 200 indicating that the device has set a 20-minute timer. The accessory device 200 may utilize the second timer data to present the visual indication of the 20-minute timer along with presentation of the 10-minute timer. As shown in FIG. 2, because the 10-minute timer and the 20-minute timer overlap, illuminating 20 of the light elements 210 at the same intensity and/or color may allow a user to visualize the 20-minute timer, but may not allow the user to visualize the 10-minute timer. As such, the light elements 210 corresponding to the first timer may emit light at a different intensity and/or color than the light elements 210 corresponding to the second timer such that both timers can be visualized at the same time. It should be understood that while two timers are utilized herein by way of example, one, two, or more than two timers may be set by the device and/or may be visually presented via the accessory device 200.

Figure 3:
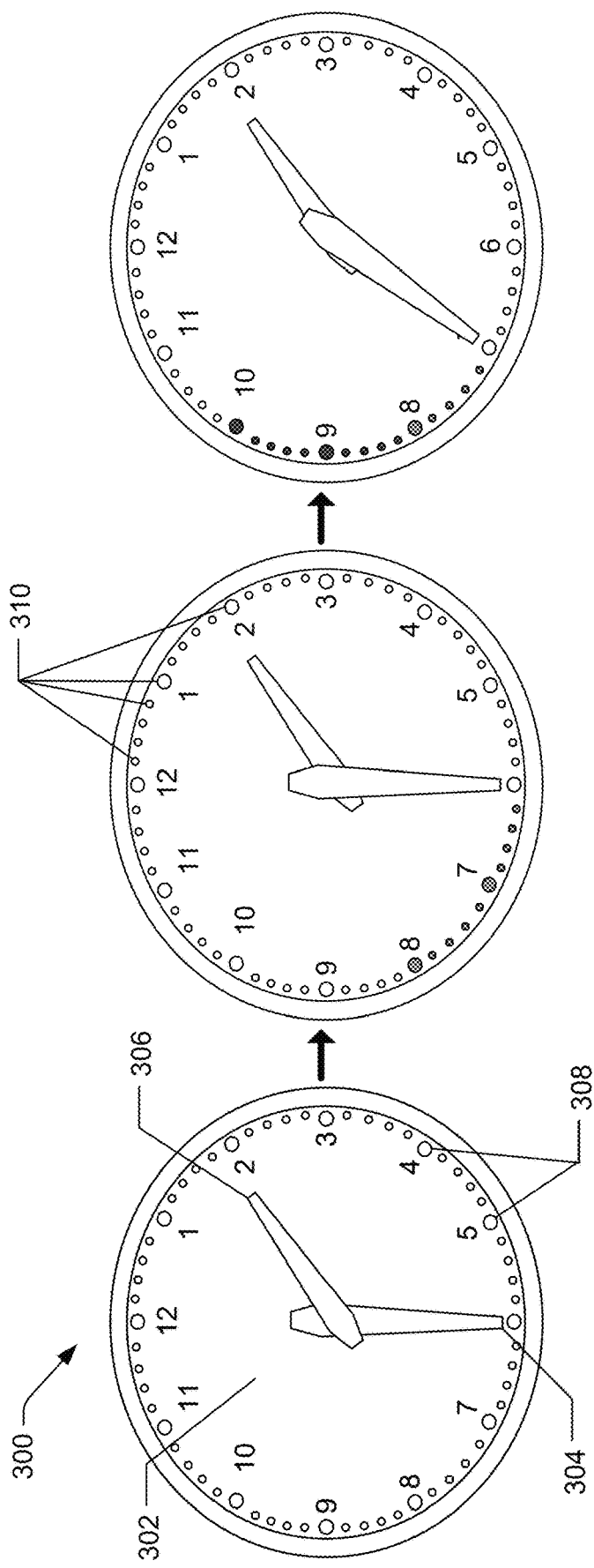
FIG. 3 illustrates another example timer visualization device depicting indications of multiple timers that have been set.

FIG. 3 illustrates another example accessory device 300 depicting indications of multiple timers that have been set. FIG. 3 depicts a progression, from left to right, of display of timers on an accessory device 300. The accessory device 300 may have the same or similar components as the accessory device 104 from FIG. 1. Additionally, the accessory device 300 may be configured to perform the same or similar operations as the accessory device 100 from FIG. 1. For example, the accessory device 300 may include a body member 302, a minute hand 304, an hour hand 306, a second hand (not shown), and one or more time indicators 308. The time indicators 308 may include indicators of hours, such as the numbers 1-12, indicators of minutes and/or seconds, such as indicators between the hour indicators.

The accessory device 300 may include additional components such as, for example, one or more processors, one or more network interfaces, one or more clock components, memory, and/or one or more light elements. Additionally, or alternatively, the clock components may include a moveable member configured to be physically moved, such as by a user and/or by a motor, to set a timer. For example, the moveable member may be a dial that may be rotated.

Additionally, or alternatively, the clock components may include a display configured to present a visual indication of time.

The accessory device 300 may additionally include one or more light elements 310, which may include, for example, LEDs. The light elements 310 may be situated with respect to the body member 302 of the accessory device 300 such that the light elements 310 correspond to some or all of time indicators 308 of the accessory device 300. Using the wall clock accessory device 300 depicted in FIG. 3 as an example, the light elements 310 may be associated with some or all of the minute indicators and/or hour indicators of the time indicators 308. Additionally, or alternatively, the light elements 310 may include one or more displays configured to display content instead of or in addition to emitting light.

As shown in the left-most depiction of the accessory device 300 in FIG. 3, the light elements 310 may not emit light or may emit light at the same or substantially the same intensity and/or color when a timer has not been set by a device and/or a remote system. A user may then speak a user utterance to the device. The microphones of the device may capture the user utterance and may generate corresponding audio data. The audio data may be sent, via a network, to a remote system. An ASR component of the remote system may process the audio data and generate corresponding text data. A NLU component of the remote system may utilize the text data to determine intent data representing an intent of the user to, in these examples, set and/or control one or more timers via the device.

One or more speechlets of the remote system may receive the intent data from the NLU component and may utilize the intent data to identify, determine, and/or generate directive data corresponding to the intent data. For example, the intent data may indicate an intent associated with the user utterance, such as a "set timer" intent. Based at least in part on this intent data, the remote system, such as via an orchestrator, may send the intent data or a portion thereof to a speechlet configured to identify, determine, and/or generate directive data associated with setting timers. As shown in FIG. 3, the directive data may indicate that a timer is to be set via the device for an amount of time of 10 minutes.

The directive data may be sent from the remote system to the device. Based at least in part on the directive data, a timer application of the device may cause a timer to be set via the device. The timer may be set for 10 minutes in this example. The device, having set the timer, may send timer data to the accessory device 300. In examples, the device may identify, determine, and/or generate the timer data. In other examples, the remote system may identify, determine, and/or generate the timer data add may send the timer data to the accessory device 300, such as via the device. The accessory device 300 may receive the timer data, and a timer application of the accessory device 300 may utilize the timer data to cause a visual indication of the timer to be displayed and its associated duration via the accessory device 300.

For example, having received the timer data indicating a timer for 10 minutes has been set, the accessory device 300 may cause the light elements 310 of 10 of the time indicators 308, such as 10 of the minute indicators to emit light. The device and/or the accessory device 300 may determine a current position of the minute hand 304. The light elements 310 to be illuminated by correspond to the light elements 310 of the time indicators 308 that indicate time after the current position of the minute hand 304. Using the wall clock as an example, the current position of the minute hand 304 may be determined to be pointed toward the "6" time indicator 308. The light elements 310 corresponding to the minute indicators between the "6" time indicator 308 and the "8" time indicator 308 may emit light in this 10-minute timer example. This is shown in the middle depiction of the accessory device 300 in FIG. 3. In this way, the accessory device 300 may cause display of the 10-minute timer. As the timer progresses, the light elements 310 may cease outputting light. For example, at or after the lapse of one minute of the timer, one of the light emitters 310, such as the light element 310 associated with the "6" time indicator 308 may cease outputting light. Once the amount of time associated with the timer lapses, the light elements 310 may cease outputting the light and/or may output light in a manner that visually indicates that the amount of time has lapsed.

Additionally, in examples where more than one timer is set via the device, multiple visual indications corresponding to the timers may be presented via the accessory device 300. The visual indications may include, in examples where the accessory device 300 utilizes light elements 310, differences in light intensity between the light elements 310 utilized for a first timer and the light elements 310 utilized for a second timer may be used. Additionally, or alternatively, differences in light color between the first timer light elements 310 and the second timer light elements 310 may be utilized. Additionally, or alternatively, the accessory device 300 may have multiple light elements 310 associated with each time indicator 308 such that setting of multiple timers results in multiple arcs of light elements 310 being utilized to visualize the different timers. The presentation of multiple visual indications corresponding to timers is shown with respect to the right-most depiction of the accessory device 300 in FIG. 3.

For example, the user's first user utterance corresponded to a request to set a 10-minute timer. The user or another user may speak a second user utterance corresponding to a request to set a 20-minute timer. The device may send second timer data to the accessory device 300 indicating that the device has set a 20-minute timer. The accessory device 300 may utilize the second timer data to present the visual indication of the 20-minute timer along with presentation of the 10-minute timer. As shown in FIG. 3, because the 10-minute timer and the 20-minute timer overlap, illuminating 20 of the light elements 310 at the same intensity and/or color may allow a user to visualize the 20-minute timer, but may not allow the user to visualize the 10-minute timer. As such, the light elements 310 corresponding to the first timer may emit light at a different intensity and/or color than the light elements 310 corresponding to the second timer such that both timers can be visualized at the same time. It should be understood that while two timers are utilized herein by way of example, one, two, or more than two timers may be set by the device and/or may be visually presented via the accessory device 300.

Figure 4:
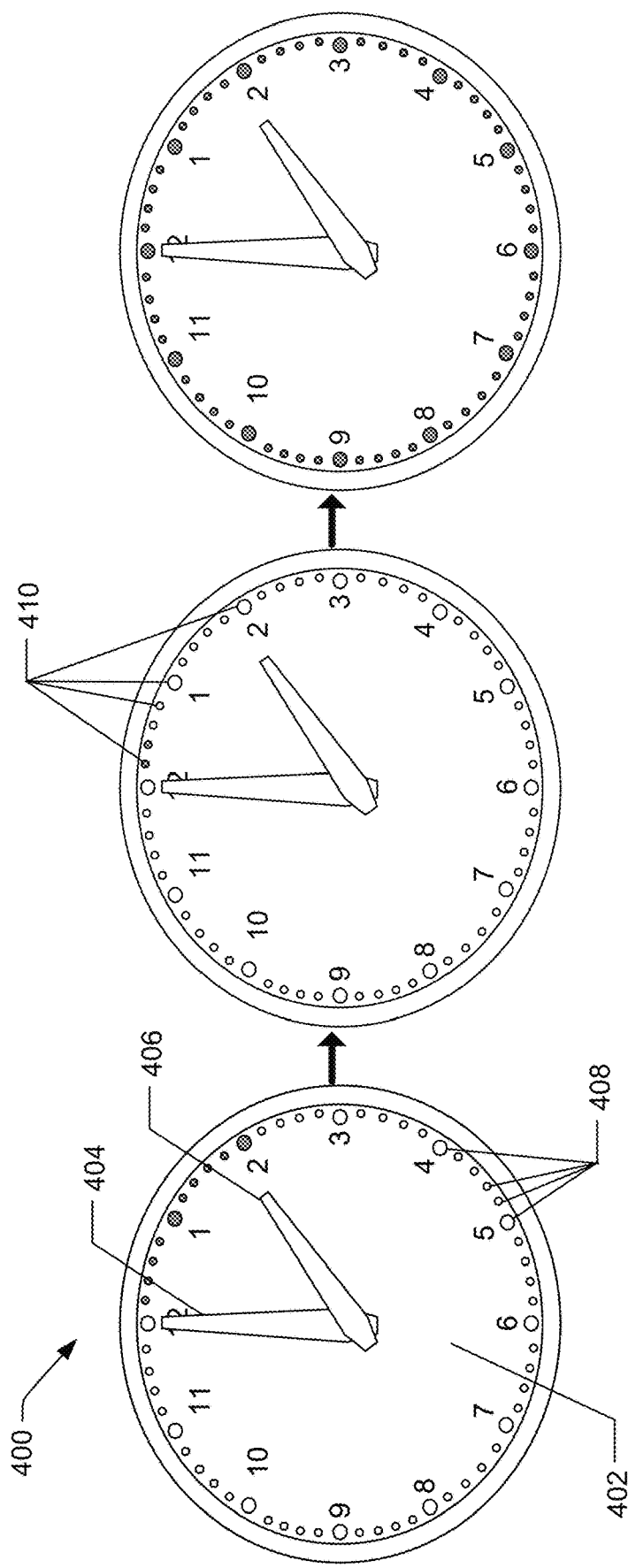
FIG. 4 illustrates another example timer visualization device depicting the progression of a timer that has been set.

FIG. 4 illustrates another example accessory device 400 depicting the progression of a timer that has been set. FIG. 4 depicts a progression, from left to right, of display of timers on an accessory device 400. The accessory device 400 may have the same or similar components as the accessory device 104 from FIG. 1. Additionally, the accessory device 400 may be configured to perform the same or similar operations as the accessory device 100 from FIG. 1. For example, the accessory device 400 may include a body member 402, a minute hand 404, an hour hand 406, a second hand (not shown), and/or one or more time indicators 408. The time indicators 408 may include indicators of hours, such as the numbers 1-12, indicators of minutes and/or seconds, such as indicators between the hour indicators.

The accessory device 400 may include additional components such as, for example, one or more processors, one or more network interfaces, one or more clock components, memory, and/or one or more light elements. Additionally, or alternatively, the clock components may include a moveable member configured to be physically moved, such as by a user and/or by a motor, to set a timer. For example, the moveable member may be a dial that may be rotated. Additionally, or alternatively, the clock components may include a display configured to present a visual indication of time.

The accessory device 400 may additionally include one or more light elements 410, which may include, for example, LEDs. The light elements 410 may be situated with respect to the body member 402 of the accessory device 400 such that the light elements 410 correspond to some or all of time indicators 408 of the accessory device 400. Using the wall clock accessory device 400 depicted in FIG. 4 as an example, the light elements 410 may be associated with some or all of the minute indicators and/or hour indicators of the time indicators 408. Additionally, or alternatively, the light elements 410 may include one or more displays configured to display content instead of or in addition to emitting light.

As shown in the left-most depiction of the accessory device 400 in FIG. 4, the light elements 410 may not emit light or may emit light at the same or substantially the same intensity and/or color when a timer has not been set by a device and/or a remote system. A user may then speak a user utterance to the device. The microphones of the device may capture the user utterance and may generate corresponding audio data. The audio data may be sent, via a network, to a remote system. An ASR component of the remote system may process the audio data and generate corresponding text data. A NLU component of the remote system may utilize the text data to determine intent data representing an intent of the user to, in these examples, set and/or control one or more timers via the device.

One or more speechlets of the remote system may receive the intent data from the NLU component and may utilize the intent data to identify, determine, and/or generate directive data corresponding to the intent data. For example, the intent data may indicate an intent associated with the user utterance, such as a "set timer" intent. Based at least in part on this intent data, the remote system, such as via an orchestrator, may send the intent data or a portion thereof to a speechlet configured to identify, determine, and/or generate directive data associated with setting timers. As shown in FIG. 4, the directive data may indicate that a timer is to be set via the device for an amount of time of 10 minutes.

The directive data may be sent from the remote system to the device. Based at least in part on the directive data, a timer application of the device may cause a timer to be set via the device. The timer may be set for 10 minutes in this example. The device, having set the timer, may send timer data to the accessory device 400. In examples, the device may identify, determine, and/or generate the timer data. In other examples, the remote system may identify, determine, and/or generate the timer data add may send the timer data to the accessory device 400, such as via the device. The accessory device 400 may receive the timer data, and a timer application of the accessory device 400 may utilize the timer data to cause a visual indication of the timer to be displayed and its associated duration via the accessory device 400.

For example, having received the timer data indicating a timer for 10 minutes has been set, the accessory device 400 may cause the light elements 410 of 10 of the time indicators 408, such as 10 of the minute indicators to emit light. Using the wall clock as an example, the light elements 410 corresponding to the minute indicators between the "12" demarcation and the "2" demarcation may emit light. This is shown in the left-most depiction of the accessory device 400 in FIG. 4. In this way, the accessory device 400 may cause display of the 10-minute timer. As the timer progresses, the light elements 410 may cease outputting light. For example, at or after the lapse of eight minutes of the timer, eight of the light elements 410, such as the light elements 410 associated with the "2" and "1" demarcations, as well as the minute demarcations between the "2" and "1" demarcations and two additional minute demarcations between the "1" and "12" demarcations may cease outputting light.

In examples, when one minute remains on a timer, all of the light elements 410, which may correspond to 60 light elements 410, may emit light. This is shown with respect to the right-most accessory device 400 of FIG. 4. As each second of the remaining minute passes, one of the light elements 410 may cease emitting light. This may represent a visual countdown of the remaining minute of the timer. Once the amount of time associated with the timer lapses, the light elements 410 may cease outputting the light and/or may output light in a manner that visually indicates that the amount of time has lapsed.

Figure 5:
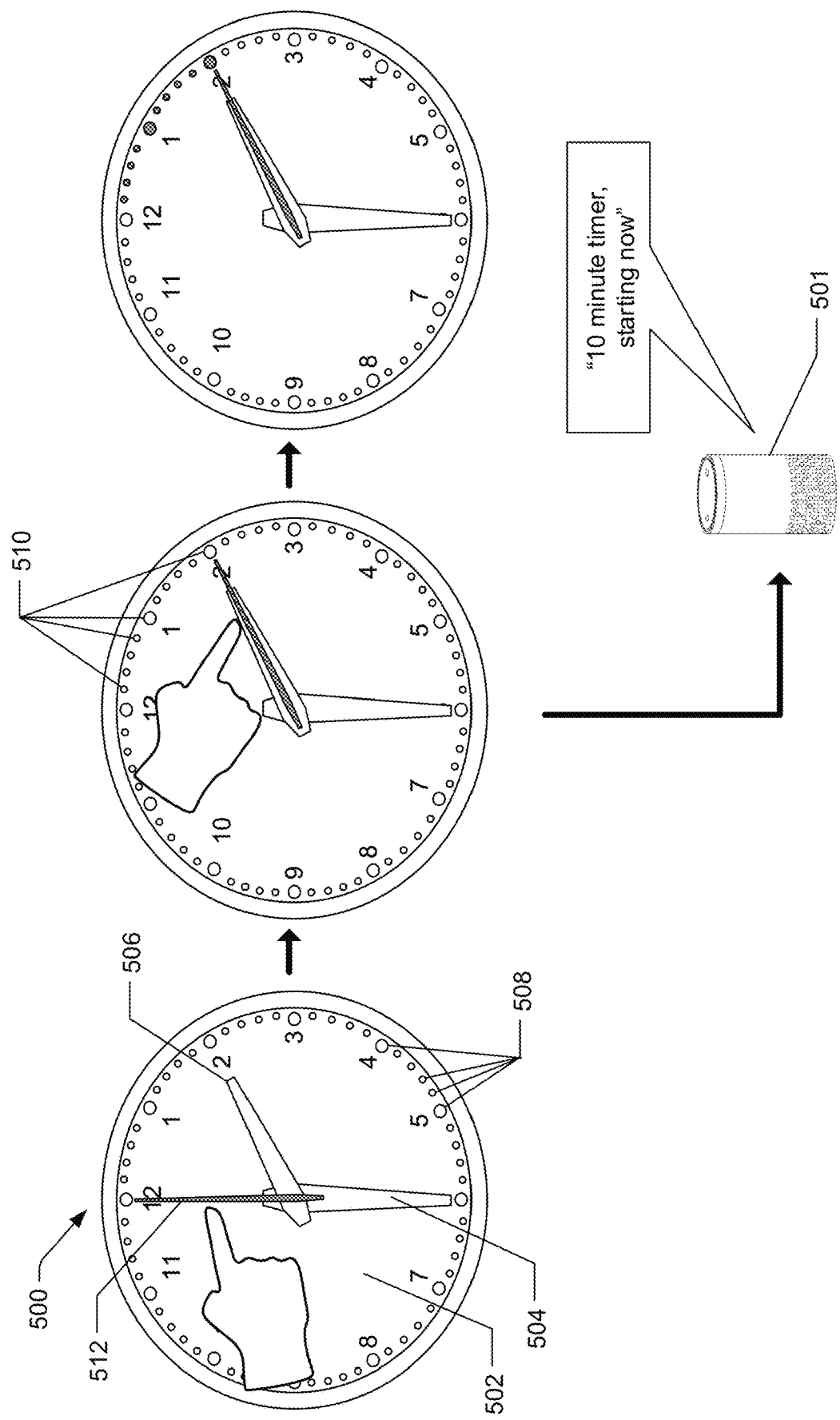
FIG. 5 illustrates another example timer visualization device depicting the setting of a timer via physical means and the corresponding setting of the timer via a device.

FIG. 5 illustrates another example accessory device 500 depicting the setting of a timer via physical means and the corresponding setting of the timer via a device 501. FIG. 5 depicts a progression, from left to right, of display of timers on an accessory device 500. The accessory device 500 may have the same or similar components as the accessory device 104 from FIG. 1. Additionally, the accessory device 500 may be configured to perform the same or similar operations as the accessory device 100 from FIG. 1. For example, the accessory device 500 may include a body member 502, a minute hand 504, an hour hand 506, a second hand (not shown), and/or one or more time indicators 508. The time indicators 508 may include indicators of hours, such as the numbers 1-12, indicators of minutes and/or seconds, such as indicators between the hour indicators. The accessory device 500 may additionally include a timer member 512, which may be moveable via physical means and/or via a motor to set a timer.

The accessory device 500 may include additional components such as, for example, one or more processors, one or more network interfaces, one or more clock components, memory, and/or one or more light elements. Additionally, or alternatively, the clock components may include a moveable member configured to be physically moved, such as by a user and/or by a motor, to set a timer. For example, the moveable member may be a dial that may be rotated. Additionally, or alternatively, the clock components may include a display configured to present a visual indication of time.

The accessory device 500 may additionally include one or more light elements 510, which may include, for example, LEDs. The light elements 510 may be situated with respect to the body member 502 of the accessory device 500 such that the light elements 510 correspond to some or all of time indicators 508 of the accessory device 500. Using the wall clock accessory device 500 depicted in FIG. 5 as an example, the light elements 510 may be associated with some or all of the minute indicators and/or hour indicators of the time indicators 508. Additionally, or alternatively, the light elements 510 may include one or more displays configured to display content instead of or in addition to emitting light.

As shown in the left-most depiction of the accessory device 500 in FIG. 5, the light elements 510 may not emit light or may emit light at the same or substantially the same intensity and/or color when a timer has not been set by a device and/or a remote system. A user may then provide a user input to set a timer. For example, the user may physically move the timer member 512 to set a timer. In the example of FIG. 5, as shown in the middle depiction of the accessory device 500, a user may move the timer member 512 from a first position, here pointed at the "12" time indicator 508, to a second position, here pointed at the "2" time indicator 508. Additionally, or alternatively, the accessory device 500 may include a bezel, which may be rotatable around the perimeter of the accessory device 500. A user may rotate the bezel to set the timer. Additionally, or alternatively, the accessory device 500 may include a touchscreen that may receive touches by a user, such as through capacitive and/or resistive touch sensing. Touch inputs corresponding to touches by the user, which may be, for example, via a finger of the user and/or an object controlled by the user, such as a stylus and/or glove. In examples where the user provides user input via a touchscreen, the user may press on a portion of the touchscreen associated with a portion of the light elements 510. For example, the user may swipe or otherwise make contact with the touchscreen at the portion of the touchscreen corresponding to the time indicators that correspond to the amount of time desired to set the timer for. For example, a user may press on the touchscreen on the "2" time indicator 508 and/or may press on the touchscreen in a swiping motion from the "12" time indicator 508 to the "2" time indicator. Timer data may be sent from the accessory device 500 to the device 501 indicating the setting of the timer. The device 501 may set a similar timer on the device 501. Additionally, setting of the timer on the accessory device 500 may cause light elements 510 to emit light to present a visual indication of the amount of time of the timer.

For example, the accessory device 500 may cause the light elements 510 of 10 of the time indicators 508, such as 10 of the minute indicators to emit light. Using the wall clock as an example, the light elements 510 corresponding to the minute indicators between the "12" demarcation and the "2" demarcation may emit light. This is shown in the right-most depiction of the accessory device 500 in FIG. 5. In this way, the accessory device 500 may cause display of the 10-minute timer. As the timer progresses, the light elements 510 may cease outputting light. Additionally, the device 501, based at least in part on receiving the timer data from the accessory device 500 may output audio corresponds to a confirmatory message that the timer has been set.

Figure 6:
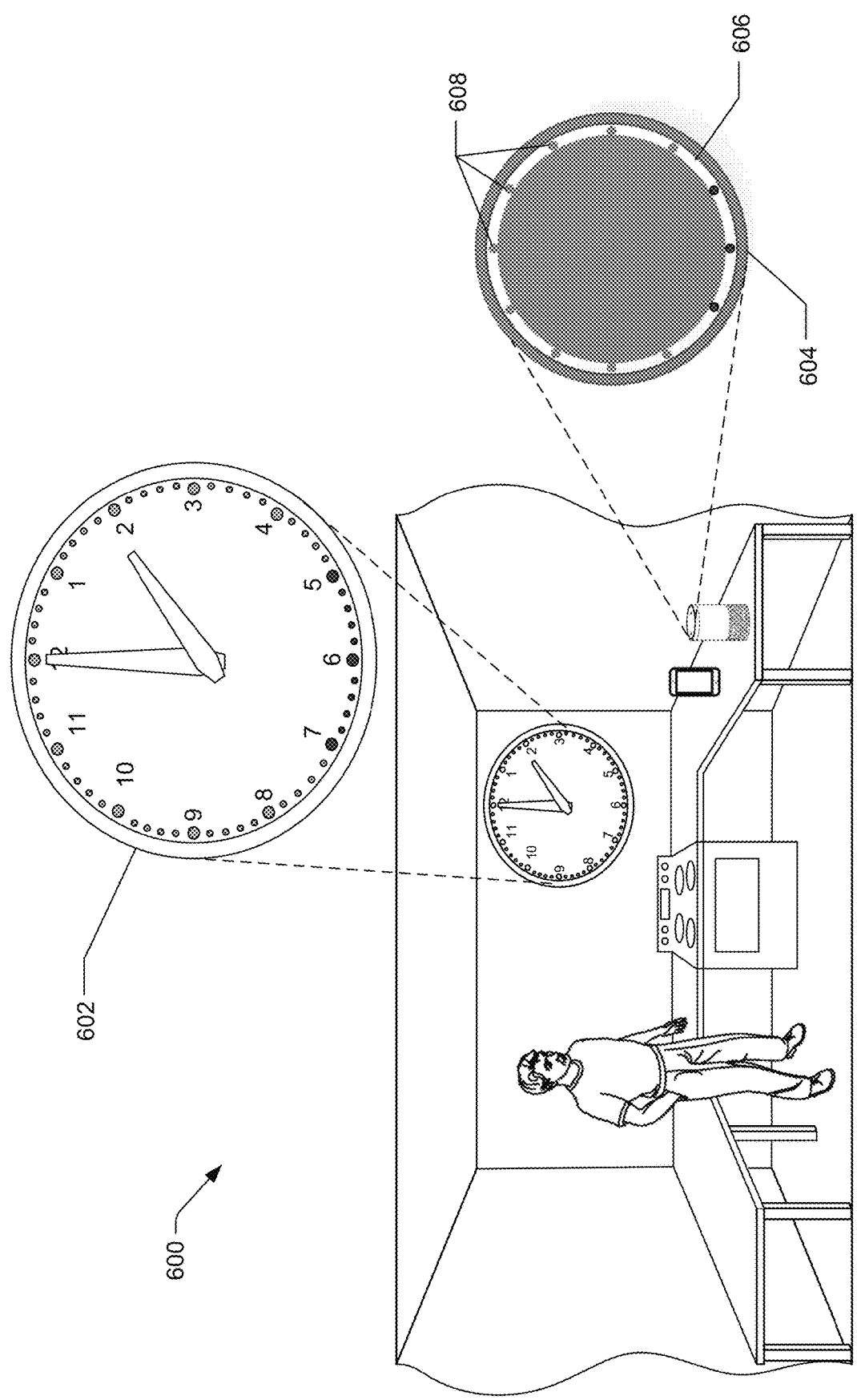
FIG. 6 illustrates a schematic diagram of an example environment for utilizing a timer visualization device and a another device such that visual indicators on both devices are synced.

FIG. 6 illustrates a schematic diagram of an example environment 600 for utilizing an accessory device 602 and a device 604 such that visual indicators on both devices are synced. FIG. 6 depicts the accessory device 602 and an expanded version of the accessory device 602. FIG. 6 also depicts the device 604 and an expanded, top-view version of the device 604. The accessory device 602 may include the same or similar components as the accessory device 104 from FIG. 1. The accessory device 602 may additionally perform the same or similar operations as the accessory device 104 from FIG. 1. The device 604 may include the same or similar components as the device 102 from FIG. 1. The device 604 may additionally perform the same or similar operations as the device 102 from FIG. 1.

Additionally, the device 604 may include a light ring 606, which may at least partially house one or more lighting elements 608. The lighting elements 608 may emit light at varying intensities and/or varying colors based at least in part on the state of the device 604, and/or as a visual indicator to a user of an action being performed by the device 604 and/or to be performed by the device 604, for example.

In examples, the device 604 may send data to and/or receive data from the accessory device 602 indicating the state of the light elements 608. Based at least in part on the data received from the device 604, the accessory device 602 may cause the light elements of the accessory device 602 to emit light at the same or a similar intensity as light emitted by the light elements 608 of the device 604. Additionally, or alternatively, the accessory device 602 may cause the light elements of the accessory device 602 to emit light at the same or a similar color as light emitted by the light elements 608 of the device 604. This is shown in FIG. 6 such that the bottom portion of light elements of the accessory device 602 are illuminated at the same or a similar intensity and color as the light elements 608 of the device 604.

Figure 7:
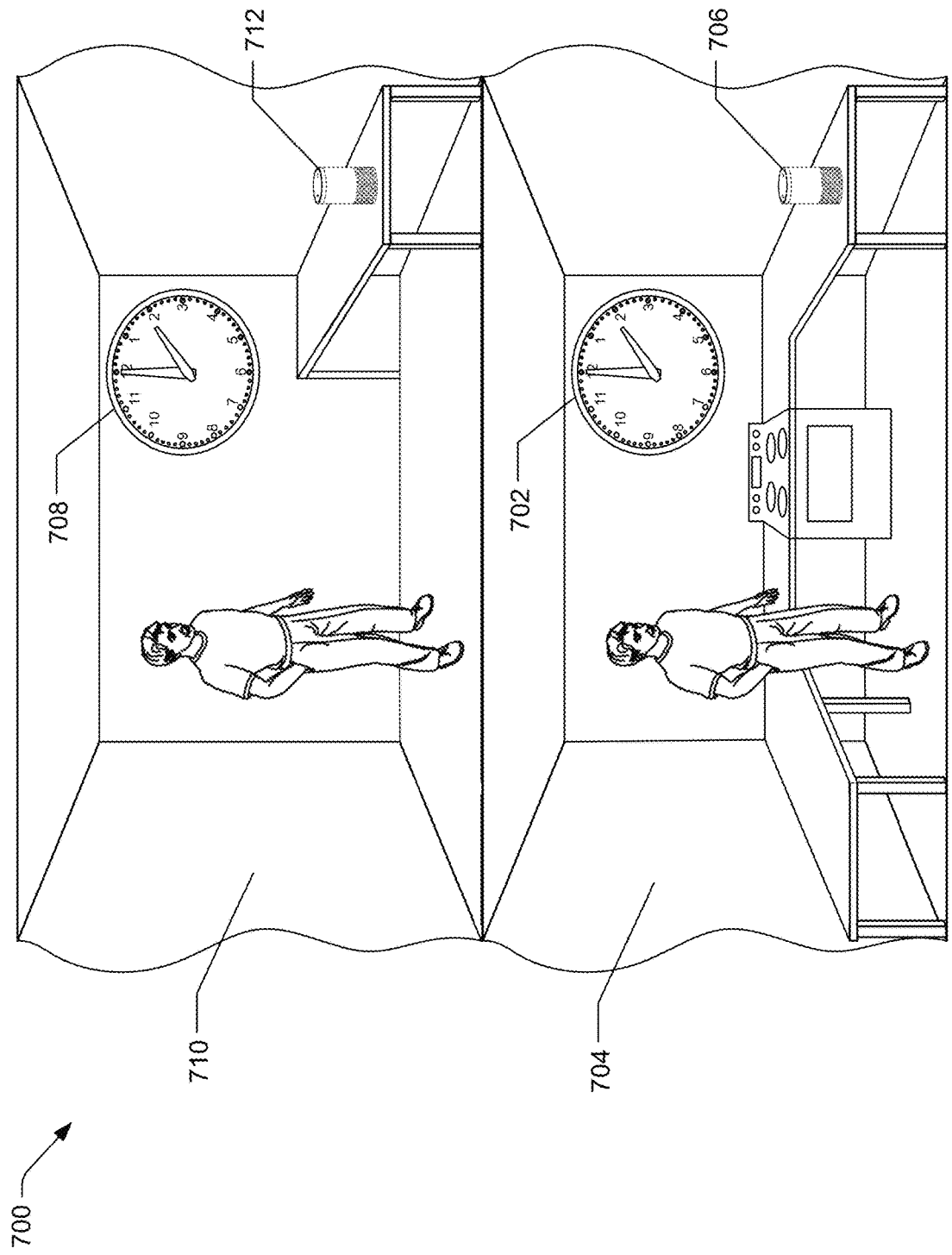
FIG. 7 illustrates a schematic diagram of an example environment with multiple areas for utilizing multiple timer visualization devices and other devices.

FIG. 7 illustrates a schematic diagram of an example environment 700 with multiple areas for utilizing multiple accessory devices and devices. The environment 700 may include a first accessory device 702 situated in a first portion 704 of the environment 700 and a first device 706 situated in the first portion 704 of the environment 700. The environment 700 may also include a second accessory device 708 situated in a second portion 710 of the environment 700 and a second device 712 situated in the second portion 710 of the environment 700.

The first accessory device 702 and the second accessory device 708 may include the same or similar components as the accessory device 104 from FIG. 1. The first accessory device 702 and the second accessory device 708 may additionally perform the same or similar operations as the accessory device 104 from FIG. 1. The first device 706 and the second device 712 may include the same or similar components as the device 102 from FIG. 1. The first device 706 and the second device 712 may additionally perform the same or similar operations as the device 102 from FIG. 1.

A user may set a timer in the first portion 704 of the environment 700 and the first accessory device 702 may display a visual indication of the timer has described herein. The user may then move from the first portion 704 of the environment 700 to the second portion 710 of the environment 700 and may desire to see the visual indication of the timer on the second accessory device 708. Timer data may be sent to the second accessory device 708 to cause the visual indication of the timer to be displayed via the second accessory device 708. Sending the timer data to the second accessory device 708 may be based at least in part on a user request, a predefined setting, and/or inferences associated with the current location of the user. The timer data may be sent to the second accessory device 708 from the first device 706 and/or from the second device 712. The user request may be captured via the first device 706 and/or from the second device 712. With respect to sending the timer data based at least in part on inferences, the second device 712 may be located in the second portion 710 of the environment 700 and may capture audio associated with the user, such as sound from footsteps, talking, turning on a light switch, etc. Audio data corresponding to this captured audio may be analyzed to determine that the user has moved from the first portion 704 of the environment 700 to the second portion 710 of the environment 700, and based at least in part on that determination, the timer data may be sent to the second accessory device 708 to present the visual indication of the timer on the second accessory device 708.

Figure 8:
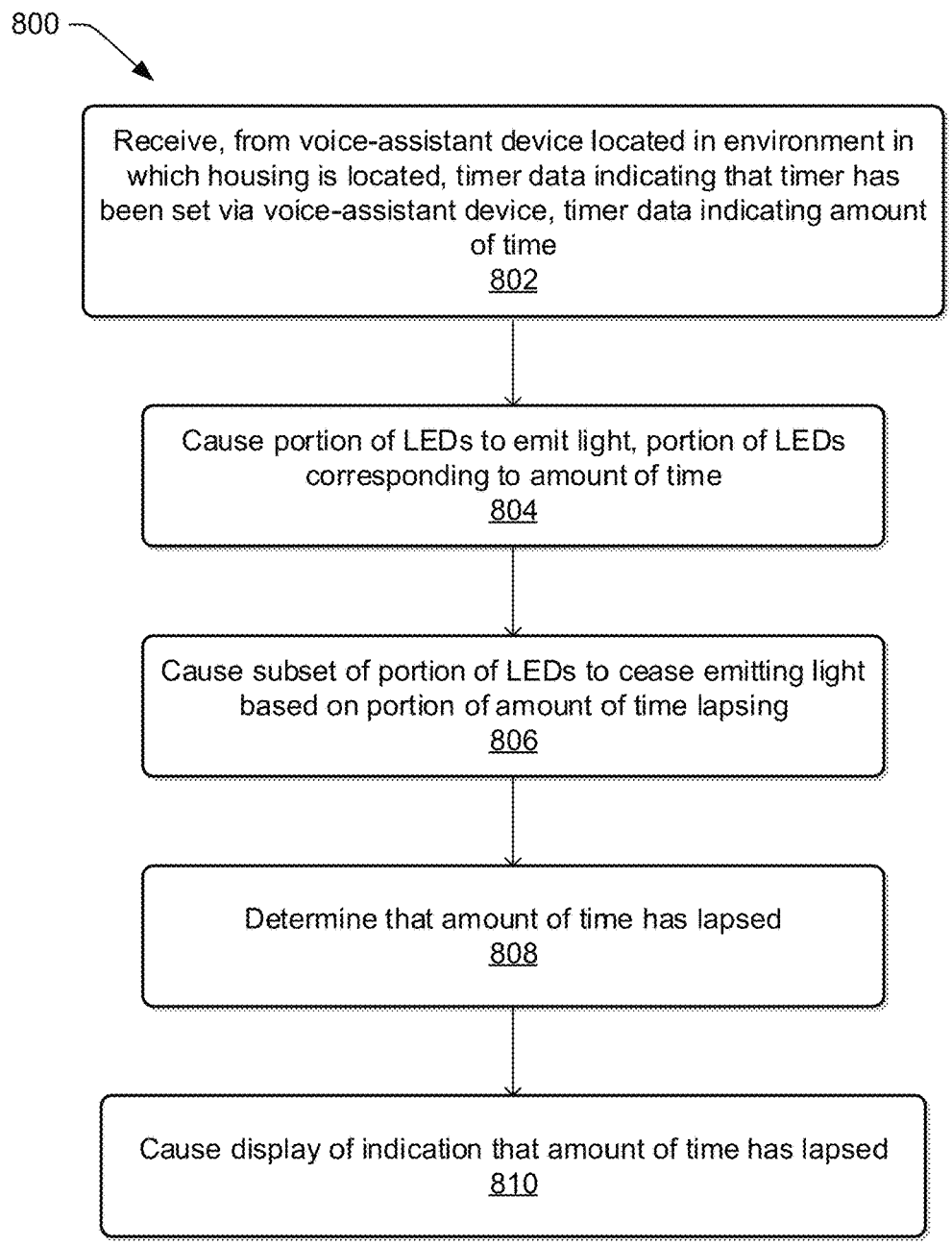
FIG. 8 illustrates a flow diagram of an example process for timer visualization.
Figure 9:
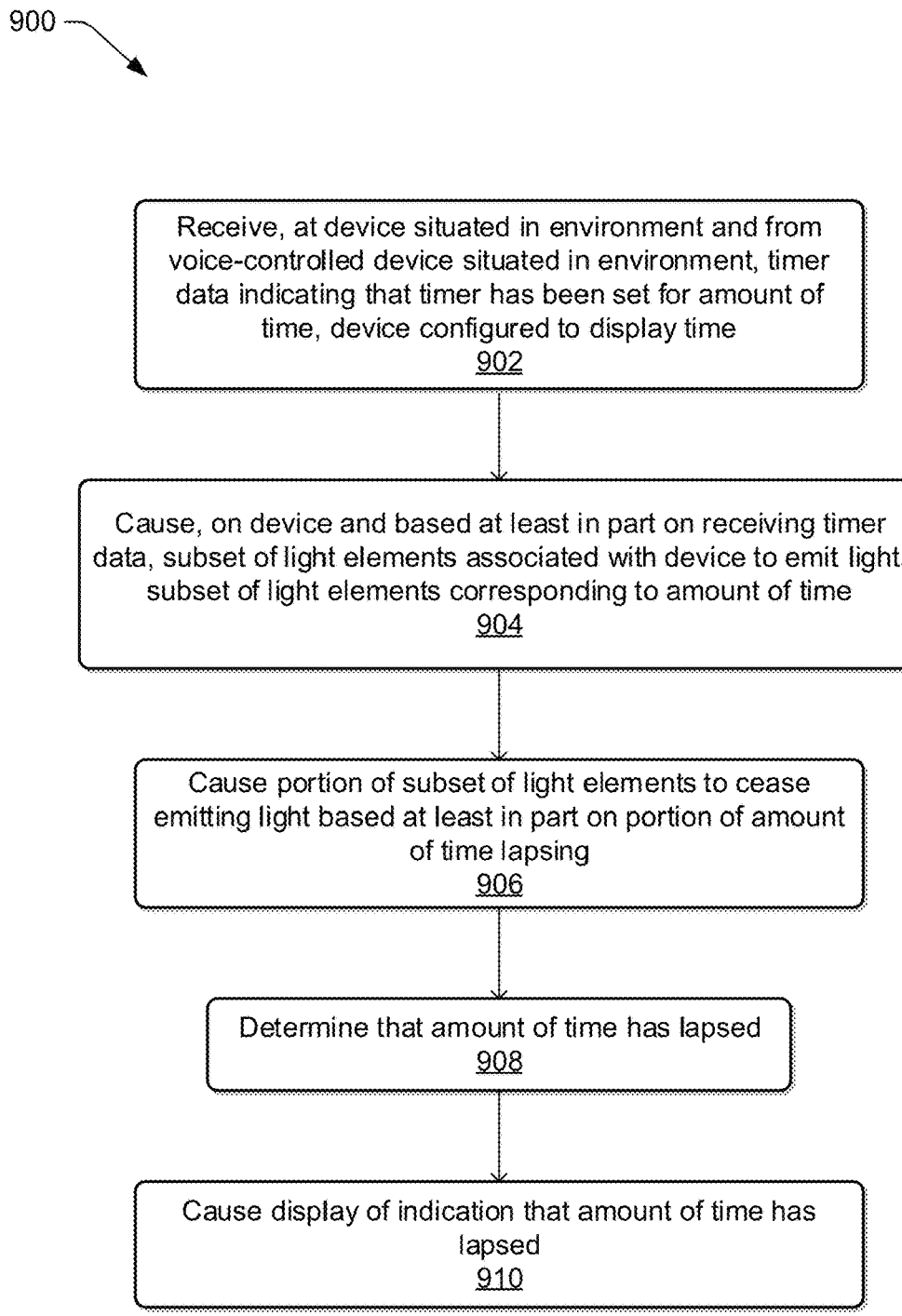
FIG. 9 illustrates a flow diagram of another example process for timer visualization.
Figure 10:
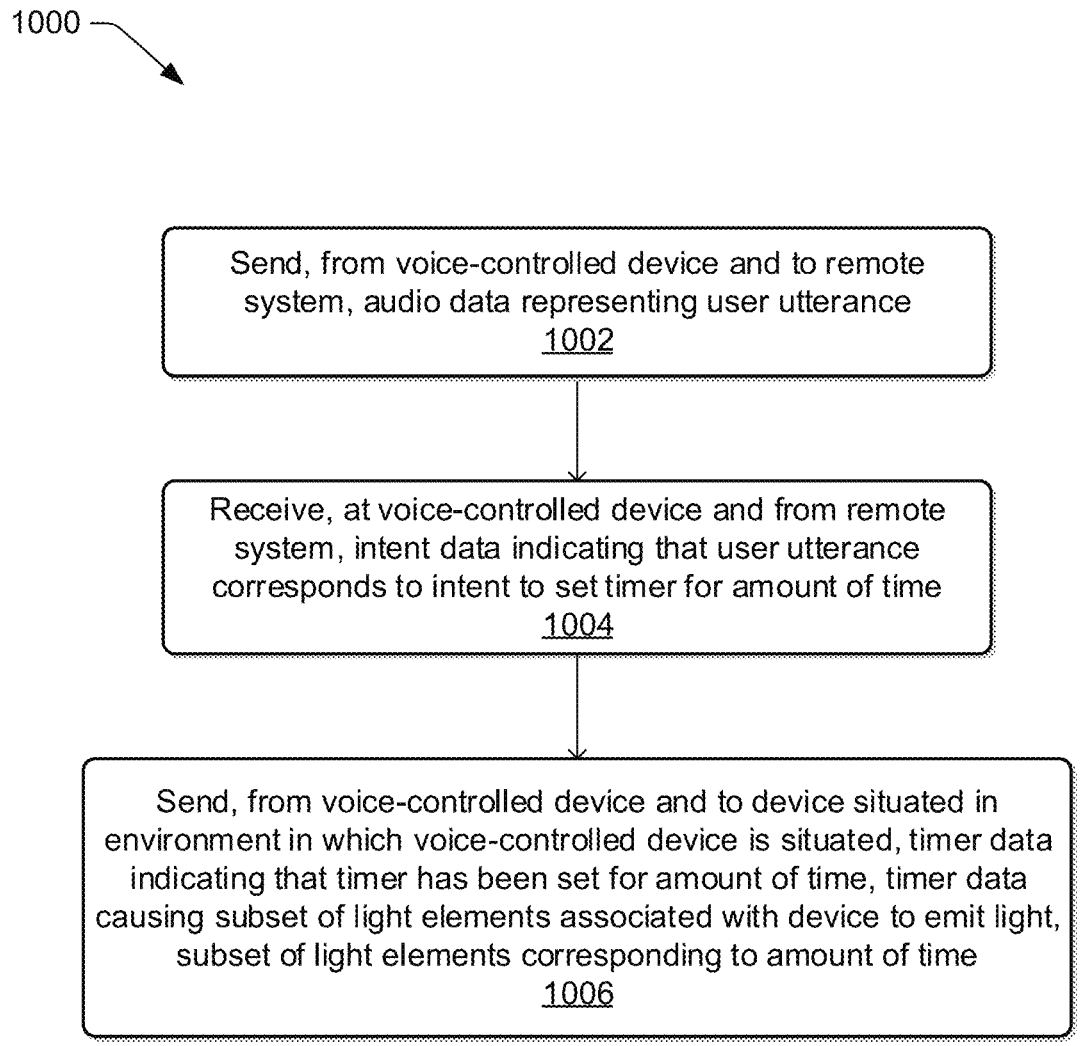
FIG. 10 illustrates a flow diagram of an example process for communication of timer data with a timer visualization device.

FIGS. 8-10 illustrate various processes for timer visualization. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7 and 11-14, although the processes may be implemented in a wide variety of other environments, architectures and systems.

FIG. 8 illustrates a flow diagram of an example process for timer visualization. The order in which the operations or steps are described is not intended to be construed as a limitation, and any number of the described operations may be combined in any order and/or in parallel to implement process 800.

At block 802, process 800 may include receiving, from a voice-controlled device located in an environment in which housing is located, timer data indicating that a timer has been set via the voice-controlled device. The timer data may indicate an amount of time the timer has been set for. For example, a user may speak a user utterance of "set timer for 10 minutes." Microphones of the voice-controlled device, also described herein as a device in examples, may capture the user utterance and generate corresponding audio data. The audio data may be sent to a remote system, where an ASR component of the remote system may generate corresponding text data. The text data may be utilized by a NLU component of the remote system to generate intent data indicating that the user utterance is associated with a "set timer" intent, and a value associated with the intent is "10 minutes." The value may be described herein as the payload. The intent data may be sent to a speechlet of the remote system, which may identify, determine, and/or generate directive data indicating that a timer is to be set via the device for an amount of time of 10 minutes.

The directive data may be sent from the remote system to the device. Based at least in part on the directive data, a timer application of the device may cause a timer to be set via the device. The timer may be set for 10 minutes, in this example. Additionally, in examples, a TTS component of the remote system may identify, determine, and/or generate audio data corresponding to a confirmatory message that the timer has been set. This audio data may be sent to the device along with, in examples, instructions for the device to output audio corresponding to the audio data. Based at least in part on receiving the audio data from the remote system, speakers of the device may output the audio. The audio may include the confirmatory message, which may be, for example "timer set for 10-minutes."

The device, having set the timer, may send the timer data to an accessory device. In examples, the device may identify, determine, and/or generate the timer data. In other examples, the remote system may identify, determine, and/or generate the timer data add may send the timer data to the accessory device, such as via the device.

At block 804, the process 800 may include causing a portion of light emitting diodes (LEDs) coupled to the body member to emit light. The portion of the LEDs may correspond to the amount of time the timer has been set for. The accessory device may receive the timer data, and a timer application of the accessory device may utilize the timer data to cause a visual indication of the timer to be displayed and its associated duration via the accessory device. For example, the accessory device may have the LEDs or other light elements associated with minute demarcations of the accessory device. Having received the timer data indicating a timer for 10 minutes has been set, the accessory device may cause the LEDs of 10 of the minute demarcations to emit light. Using a wall clock as an example, the LEDs corresponding to the minute demarcations between the "12" demarcation and the "2" demarcation may emit light. In this way, the accessory device may cause display of the 10-minute timer.

In other examples, a determination may be made as to the position of the minute hand and what demarcation is associated with the position of the minute hand. This determination may be made using, for example, a clock application and/or the timer application. For example, if the current time is 2:30, it may be determined that the minute hand is positioned such that the minute hand is pointing to the "6" demarcation. Based at least in part on the position of the minute hand, LEDs corresponding to the minute demarcations between the "6" demarcation and the "8" demarcation may emit light in the example of a 10-minute timer. In this way, the accessory device may cause display of the 10-minute timer to be 10 minutes from the current time. Additional, or alternative, means of visually presenting timers may be used. For example, instead of multiple LEDs corresponding to the number of minutes associated with the timer being utilized, one LED corresponding to the minute demarcation of the amount of time for the timer may be utilized. Additionally, or alternatively, a physical indicator of a timer may be moved to a position that indicates the amount of time. Additionally, or alternatively, a digital display may be caused to display a number corresponding to the amount of time. Additionally, or alternatively, an animatronic device may be caused to move components thereof in a manner that indicates the amount of time and/or a progression of the amount of time.

At block 806, the process 800 may include causing a subset of the portion of the LEDs to cease emitting the light based on a portion of the amount of time lapsing. Causing the subset of the portion of the LEDs to cease emitting the light may be based at least in part on receiving, from the voice-controlled device, first updated timer data indicating a remaining portion of the amount of time. A communication channel may be established between the accessory device and the device during a time period corresponding to the timer. The accessory device may receive updated timer data, such as continuously or periodically, from the device that indicates a progression of the timer. Additionally, the updated timer data may indicate that a timer has been cancelled, has expired, should be paused, and/or should be reset, for example. For example, at or after the lapse of one minute of the timer, one of the LEDs, such as the LED associated with the "2" demarcation using the example above may cease outputting light.

At block 808, the process 800 may include determining that the amount of time has lapsed. This determination may be based at least in part on second updated timer data received from the voice-controlled device in the same or a similar manner to the receipt of the first updated timer data, described above with respect to block 806.

At block 810, the process 800 may include causing display of an indication that the amount of time has lapsed. For example, once the amount of time associated with the timer lapses, the LEDs may cease outputting the light and/or may output light in a manner that visually indicates that the amount of time has lapsed.

The process 800 may additionally, or alternatively, include receiving second timer data indicating that a second a second timer has been set via the device. The second timer data may be received during the first amount of time associated with the first timer and may indicate a second amount of time the second timer has been set for. The process 800 may also include causing a second portion of the LEDs to emit second light, the second portion of the LEDs may correspond to the second amount of time the second timer has been set for. The second light emitted by the second portion of the LEDs may differ in at least one of an intensity or a color from the first light. In this way, multiple visual indications corresponding to the timers may be presented via the accessory device. The visual indications may include, in examples where the accessory device utilizes light elements, differences in light intensity between the LEDs utilized for a first timer and the LEDs utilized for a second timer may be used. Additionally, or alternatively, differences in light color between the first timer LEDs and the second timer LEDs may be utilized. Additionally, or alternatively, the accessory device may have multiple LEDs associated with each minute demarcation such that setting of multiple timers results in multiple arcs of LEDs being utilized to visualize the different timers.

The process 800 may additionally, or alternatively, include causing the LEDs to emit the light based on the remaining portion of the amount of time being one minute and causing individual ones of the LEDs to cease emitting the light during the minute in an order indicating a countdown corresponding to a lapse of the minute. In examples, when one minute remains on a timer, all of the light elements, here LEDs, which may correspond to 60 light elements, each associated with a second of time, may emit light. As each second of the remaining minute passes, one of the light elements may cease emitting light. This may represent a visual countdown of the remaining minute of the timer. Once the amount of time associated with the timer lapses, the light elements may cease outputting the light and/or may output light in a manner that visually indicates that the amount of time has lapsed.

The process 800 may additionally, or alternatively, include receiving user input via a moveable member of the accessory device. The user input may indicate the setting of a second timer via the moveable member. Additionally, or alternatively, the user input may be via touch input received via a touchscreen of the device. The process 800 may also include sending, the device, input data indicating the second timer has been set and receiving, from the voice-controlled device, second timer data indicating a second amount of time associated with the second timer. The process 800 may also include causing a second portion of the LEDs to emit second light. The section portion of the LEDs may correspond to the second amount of time the second timer has been set for. In examples, the second light may differ in at least one of an intensity or a color from the first light.

The process 800 may additionally, or alternatively, include receiving, from a remote system, second timer data indicating that a second timer has been set. The second timer data may indicate a second amount of time that the second timer has been set for. The process 800 may also include causing a second portion of the LEDs to emit light, the second portion of the LEDs corresponding to the second amount of time.

FIG. 9 illustrates a flow diagram of another example process for timer visualization. The order in which the operations or steps are described is not intended to be construed as a limitation, and any number of the described operations may be combined in any order and/or in parallel to implement process 900.

At block 902, process 900 may include receiving, at a device situated in an environment and from a voice-controlled device situated in the environment, timer data indicating that a timer has been set. The timer data may indicate an amount of time associated with the timer. The device may be configured to display time, such as via a clock. For example, a user may speak a user utterance of "set timer for 10 minutes." Microphones of the voice-controlled device, also described herein as a device in examples, may capture the user utterance and generate corresponding audio data. The audio data may be sent to a remote system, where an ASR component of the remote system may generate corresponding text data. The text data may be utilized by a NLU component of the remote system to generate intent data indicating that the user utterance is associated with a "set timer" intent, and a value associated with the intent is "10 minutes." The value may be described herein as the payload. The intent data may be sent to a speechlet of the remote system, which may identify, determine, and/or generate directive data indicating that a timer is to be set via the device for an amount of time of 10 minutes.

The directive data may be sent from the remote system to the device. Based at least in part on the directive data, a timer application of the device may cause a timer to be set via the device. The timer may be set for 10 minutes, in this example. Additionally, in examples, a TTS component of the remote system may identify, determine, and/or generate audio data corresponding to a confirmatory message that the timer has been set. This audio data may be sent to the device along with, in examples, instructions for the device to output audio corresponding to the audio data. Based at least in part on receiving the audio data from the remote system, speakers of the device may output the audio. The audio may include the confirmatory message, which may be, for example "timer set for 10-minutes."

The device, having set the timer, may send the timer data to an accessory device. In examples, the device may identify, determine, and/or generate the timer data. In other examples, the remote system may identify, determine, and/or generate the timer data add may send the timer data to the accessory device, such as via the device.

At block 904, the process 900 may include causing, on the device and based at least in part on receiving the timer data, a subset of light elements associated with the device to emit light. The subset of the light elements may correspond to the amount of time. The device, also described herein as an accessory device, may receive the timer data, and a timer application of the accessory device may utilize the timer data to cause a visual indication of the timer to be displayed and its associated duration via the accessory device. For example, the accessory device may have the LEDs or other light elements associated with minute demarcations of the accessory device. Having received the timer data indicating a timer for 10 minutes has been set, the accessory device may cause the LEDs of 10 of the minute demarcations to emit light. Using a wall clock as an example, the LEDs corresponding to the minute demarcations between the "12" demarcation and the "2" demarcation may emit light. In this way, the accessory device may cause display of the 10-minute timer.

In other examples, a determination may be made as to the position of the minute hand and what demarcation is associated with the position of the minute hand. This determination may be made using, for example, a clock application and/or the timer application. For example, if the current time is 2:30, it may be determined that the minute hand is positioned such that the minute hand is pointing to the "6" demarcation. Based at least in part on the position of the minute hand, LEDs corresponding to the minute demarcations between the "6" demarcation and the "8" demarcation may emit light in the example of a 10-minute timer. In this way, the accessory device may cause display of the 10-minute timer to be 10 minutes from the current time. Additional, or alternative, means of visually presenting timers may be used. For example, instead of multiple LEDs corresponding to the number of minutes associated with the timer being utilized, one LED corresponding to the minute demarcation of the amount of time for the timer may be utilized. Additionally, or alternatively, a physical indicator of a timer may be moved to a position that indicates the amount of time. Additionally, or alternatively, a digital display may be caused to display a number corresponding to the amount of time. Additionally, or alternatively, an animatronic device may be caused to move components thereof in a manner that indicates the amount of time and/or a progression of the amount of time.

In further examples, causing presenting of the first indication of the amount of time may include causing a first light element associated with the accessory device to emit first light associated with a first time indicator, such as, for example, the "2" hour indicator. Causing presenting of the second indication may include causing a second light element associated with the first device to emit second light. The second light element may be associated with a second timer indicator, such as, for example, the "4" hour indicator. When the second light element emits second light, the first light element may be caused to cease emitting the first light. Causing presentation of the third indication may include causing the second time element to cease emitting the second light.

At block 906, the process 900 may include causing a portion of the subset of the light elements to cease emitting light based at least in part on a portion of the amount of time lapsing. Causing the portion of the subset of the light elements to cease emitting light may be based at least in part on receiving, from the voice-controlled device, first updated timer data indicating a remaining portion of the amount of time. A communication channel may be established between the accessory device and the device during a time period corresponding to the timer. The accessory device may receive updated timer data, such as continuously or periodically, from the device that indicates a progression of the timer. Additionally, the updated timer data may indicate that a timer has been cancelled, has expired, should be paused, and/or should be reset, for example.

For example, at or after the lapse of one minute of the timer, one of the LEDs, such as the LED associated with the "2" demarcation using the example above may cease outputting light. In examples, the light elements of the accessory device may be positioned in a circular arrangement with respect to the accessory device. The number of the light elements that emit light may correspond to a number of minutes of the amount of time. When the updated timer data indicates that a portion of the amount of time has lapsed, a portion of the light elements corresponding to the portion of the amount of time that has lapsed may cease emitting light, such as in a counterclockwise manner. In this way, the progression of the timer may be easily and intuitively viewed by the user.

At block 908, the process 900 may include determining that the amount of time has lapsed. This determination may be based at least in part on receiving, from the voice-controlled device, second updated timer data indicating that the amount of time has lapsed. A communication channel may be established between the accessory device and the device during a time period corresponding to the timer. The accessory device may receive updated timer data, such as continuously or periodically, from the device that indicates a progression of the timer. Additionally, the updated timer data may indicate that a timer has been cancelled, has expired, should be paused, and/or should be reset, for example.

At block 910, the process 900 may include causing display of an indication that the amount of time has lapsed, such as by causing a remaining portion of the light elements to cease emitting the light. For example, once the amount of time associated with the timer lapses, the LEDs may cease outputting the light and/or may output light in a manner that visually indicates that the amount of time has lapsed.

The process 900 may additionally, or alternatively, include receiving second timer data indicating that a second a second timer has been set via the device. The second timer data may be received during the first amount of time associated with the first timer and may indicate a second amount of time the second timer has been set for. The process 900 may also include causing a second portion of the LEDs to emit second light, the second portion of the LEDs may correspond to the second amount of time the second timer has been set for. The second light emitted by the second portion of the LEDs may differ in at least one of an intensity or a color from the first light. In this way, multiple visual indications corresponding to the timers may be presented via the accessory device. The visual indications may include, in examples where the accessory device utilizes light elements, differences in light intensity between the LEDs utilized for a first timer and the LEDs utilized for a second timer may be used. Additionally, or alternatively, differences in light color between the first timer LEDs and the second timer LEDs may be utilized. Additionally, or alternatively, the accessory device may have multiple LEDs associated with each minute demarcation such that setting of multiple timers results in multiple arcs of LEDs being utilized to visualize the different timers.

The process 900 may additionally, or alternatively, include receiving user input via a moveable member of the accessory device. The user input may additionally, or alternatively, be provided via touch input on a touchscreen of the device. The user input may indicate the setting of a second timer. The process 900 may also include sending, the device, input data indicating the second timer has been set and receiving, from the voice-controlled device, second timer data indicating a second amount of time associated with the second timer. The process 900 may also include causing a second portion of the light elements to emit second light. The section portion of the light elements may correspond to the second amount of time the second timer has been set for. In examples, the second light may differ in at least one of an intensity or a color from the first light.

FIG. 10 illustrates a flow diagram a flow diagram of an example process for communication of timer data with a timer visualization device. The order in which the operations or steps are described is not intended to be construed as a limitation, and any number of the described operations may be combined in any order and/or in parallel to implement process 1000.

At block 1002, process 1000 may include sending, from a voice-controlled device and to a remote system, audio data representing a user utterance. For example, a user may speak a user utterance of "set timer for 10 minutes." Microphones of the voice-controlled device, also described herein as a device in examples, may capture the user utterance and generate corresponding audio data. The audio data may be sent to a remote system.

At block 1004, the process 1000 may include receiving, at the voice-controlled device and from the remote system, intent data indicating that the user utterance corresponds to an intent to set a timer for an amount of time. For example, an ASR component of the remote system may generate text data corresponding to the audio data. The text data may be utilized by a NLU component of the remote system to generate intent data indicating that the user utterance is associated with a "set timer" intent, and a value associated with the intent is "10 minutes." The value may be described herein as the payload. The intent data and/or directive data corresponding to the intent data may be sent to the first device.

Based at least in part on the directive data, a timer application of the device may cause a timer to be set via the device. The timer may be set for 10 minutes, in this example. Additionally, in examples, a TTS component of the remote system may identify, determine, and/or generate audio data corresponding to a confirmatory message that the timer has been set. This audio data may be sent to the device along with, in examples, instructions for the device to output audio corresponding to the audio data. Based at least in part on receiving the audio data from the remote system, speakers of the device may output the audio. The audio may include the confirmatory message, which may be, for example "timer set for 10-minutes."

At block 1006, the process 1000 may include sending, from the voice-controlled device and to another device situated in an environment in which the voice-controlled device is situated, timer data indicating that the timer has been set for the amount of time. The timer data may cause a subset of light elements associated with the other device to emit light. The subset of the light elements may correspond to the amount of time. In examples, the device may identify, determine, and/or generate the timer data. In other examples, the remote system may identify, determine, and/or generate the timer data add may send the timer data to the accessory device, such as via the device.

The process 1000 may also include sending, from the voice-controlled device and to the other device, updated timer data indicating a remaining portion of the amount of time. The updated timer data may cause the other device to present a visual indication of the remaining portion of the amount of time. A communication channel may be established between the accessory device and the device during a time period corresponding to the timer. The accessory device may receive updated timer data, such as continuously or periodically, from the device that indicates a progression of the timer. Additionally, the updated timer data may indicate that a timer has been cancelled, has expired, should be paused, and/or should be reset, for example.

The process 1000 may additionally, or alternatively, include sending, from the voice-controlled device and to the remote system, second audio data representing a second user utterance. The second audio data may be sent during the first amount of time. The process 1000 may also include receiving, at the voice-controlled device and from the remote system, second intent data indicating that the second user utterance corresponds to a second intent to set a second timer for a second amount of time. The process 1000 may also include sending, from the voice-controlled device and to the accessory device, second timer data indicating that the second timer has been set for the second amount of time. The second timer data may cause the other device to present an indication of the second amount of time during presentation of at least a portion of the first amount of time. In this way, multiple visual indications corresponding to the timers may be presented via the accessory device. The visual indications may include, in examples where the accessory device utilizes light elements, differences in light intensity between the light elements utilized for a first timer and the light elements utilized for a second timer may be used. Additionally, or alternatively, differences in light color between the first timer light elements and the second timer light elements may be utilized. Additionally, or alternatively, the accessory device may have multiple light elements associated with each minute demarcation such that setting of multiple timers results in multiple arcs of light elements being utilized to visualize the different timers.

The process 1000 may additionally, or alternatively, include determining, based at least in part on analysis of the audio data, a user profile associated with the user utterance. The user profile associated with a timer visualization preference and wherein the timer data causes the second device to present the visual indication based at least in part on the timer visualization preference. For example, analysis of the audio data may include determining that acoustic characteristics of the audio data are similar to and/or match acoustic characteristics of reference audio data, where the reference audio data is associated with the user profile. In an example, the reference audio data may correspond to previously-supplied speech of a given user associated with the user profile. The reference audio data may be stored and compared to the audio data corresponding to the user utterance to determine that the audio data is being spoken by a user associated with the user profile. The user profile may have one or more timer visualization preferences associated therewith, which may indicate preferences for how visualization of timers is to be carried out. For example, a timer visualization preference may be associated with emission of a particular intensity of light and/or a particular color of light. The timer visualization preferences may additionally, or alternatively, include an indication of whether the timer should be visualized as a counterclockwise countdown ending at the "12" demarcation of the accessory device and/or a clockwise countdown from the current position of the minute hand. The timer visualization preferences may additionally, or alternatively, include indications of which accessory devices to display timer visualization on.

The process 1000 may additionally, or alternatively, include the device sending data to and/or receiving data from the accessory device indicating the state of light elements of the device. Based at least in part on the data received from the device, the accessory device may cause the light elements of the accessory device to emit light at the same or a similar intensity as light emitted by the light elements of the device. Additionally, or alternatively, the accessory device may cause the light elements of the accessory device to emit light at the same or a similar color as light emitted by the light elements of the device. In this way, the state of the device may be visualized and mimicked by the accessory device.

The process 1000 may additionally, or alternatively, include receiving association data indicating that a third device is associated with at least one of the voice-controlled device or the second device and sending the timer data to the third device to cause the third device to present a visual indication of the timer. For example, an environment may include multiple accessory devices disposed, for example, in different portions of the environment. For example, one accessory device may be located in a kitchen of a home, while another accessory device may be located in a bedroom. The user may set a timer in the kitchen and the kitchen accessory device may display the visual indication of the timer has described herein. The user may then move from the kitchen to the bedroom and may desire to see the visual indication of the timer on the bedroom accessory device. The timer data may be sent to the bedroom accessory device to cause the visual indication of the timer to be displayed via the bedroom accessory device. Sending the timer data to the bedroom accessory device may be based at least in part on a user request, a predefined setting, and/or inferences associated with the current location of the user. For example, directive data indicating a directive to send the timer data to the third device may be received and may be based at least in part on a second user utterance representing a request to present the amount of time via the third device. For example, a second device may be located in the bedroom and may capture audio associated with the user, such as sound from footsteps, talking, turning on a light switch, etc. Audio data corresponding to this captured audio may be analyzed to determine that the user has moved from the kitchen to the bedroom, and based at least in part on that determination, the timer data may be sent to the bedroom accessory device to present the visual indication of the timer on the bedroom accessory device.

Figure 11:
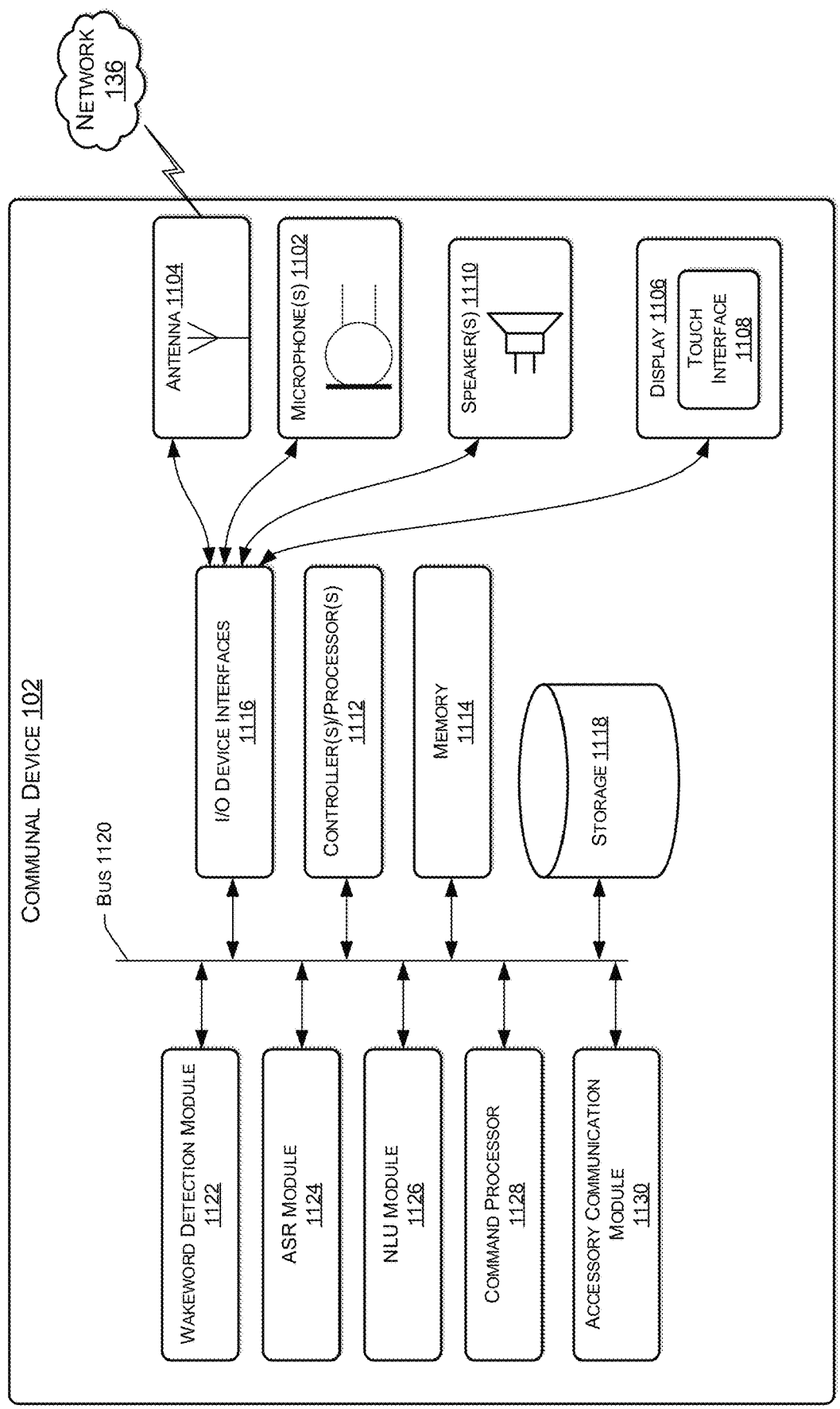
FIG. 11 illustrates a conceptual diagram of example components of a voice-controlled device.
Figure 12:
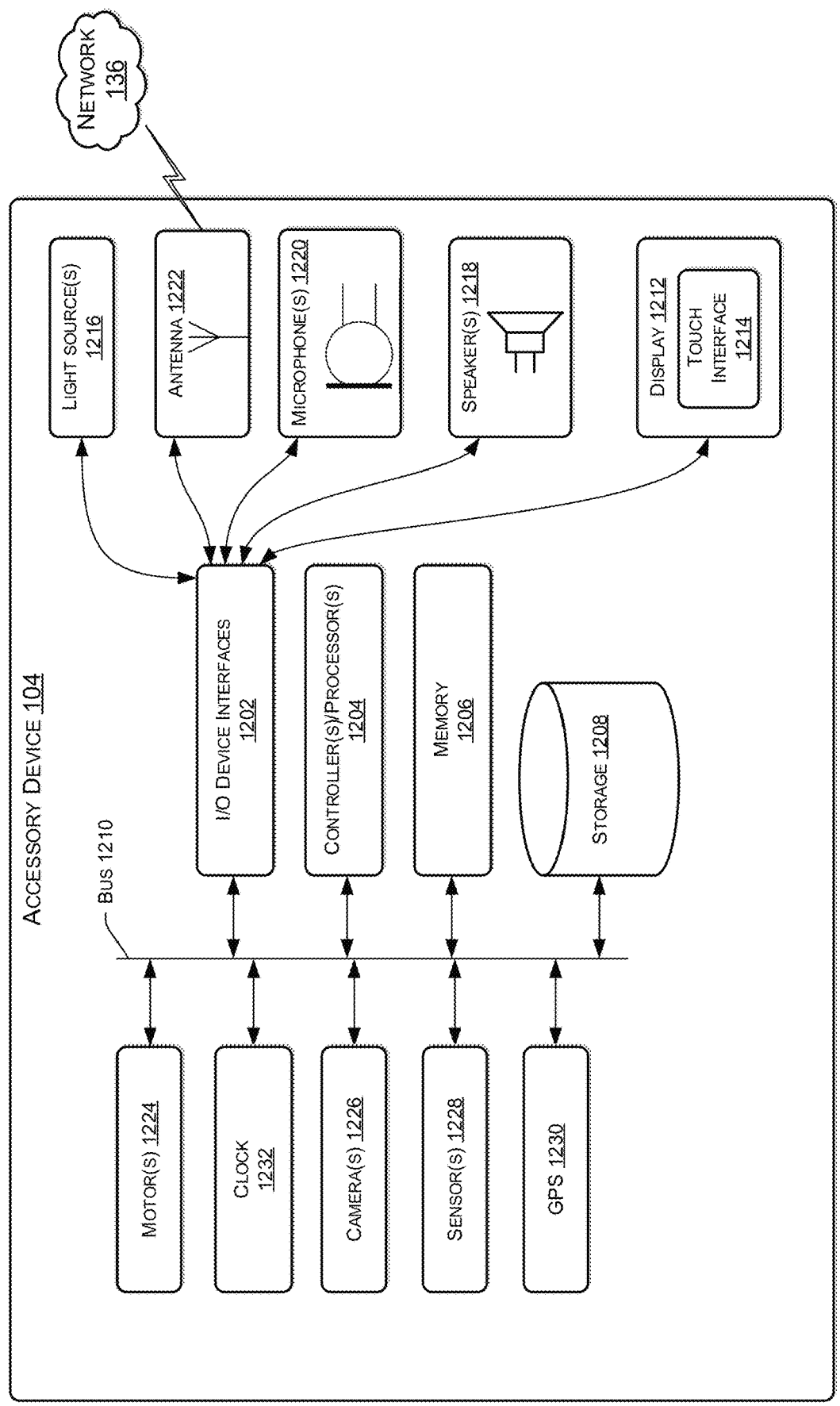
FIG. 12 illustrates a conceptual diagram of example components of an accessory device, such as a timer visualization device.

FIG. 11 illustrates a conceptual diagram of example components of a device, such as a voice-controlled device. FIG. 12 illustrates a conceptual diagram of example components of an accessory device to the voice-controlled device. In operation, each of these devices (or groups of devices) may include computer-readable and computer-executable instructions that reside on the devices 102 and 104, as will be discussed further below.

The voice-controlled device 102 may be implemented as a standalone device 102 that is relatively simple in terms of functional capabilities with limited input/output components, memory, and processing capabilities. For instance, the voice-controlled device 102 may not have a keyboard, keypad, or other form of mechanical input. The device 102 may also lack a display (other than simple lights, for instance) and a touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the voice-controlled device 102. Nonetheless, the primary, and potentially only mode, of user interaction with the device 102 is through voice input and audible output. In some instances, the device 102 may simply comprise a microphone 1102, a power source, and functionality for sending generated audio data via one or more antennas 1104 to another device.

The voice-controlled device 102 may also be implemented as a more sophisticated computing device, such as a computing device similar to, or the same as, a smart phone or personal digital assistant. The device 102 may include a display 1106 with a touch interface 1108 and various buttons for providing input as well as additional functionality such as the ability to send and receive communications. Alternative implementations of the voice-controlled device 102 may also include configurations as a personal computer. The personal computer may include a keyboard, a mouse, a display 1106, and other hardware or functionality that is found on a desktop, notebook, netbook, or other personal computing devices. In examples, the voice-controlled device 102 may include an automobile, such as a car, and the accessory device 104 may be disposed in the car and connected, via wired or wireless coupling, to the car. In other examples, the voice-controlled device 102 may include a pin on a user's clothes or a phone on a user's person, and the accessory device 104 may comprise an automobile, such as a car, that operates in coordination with the pin or phone, as described herein. In examples, the voice-controlled device 102 may include speaker(s) 1110. In other examples, the voice-controlled device 102 may not include speaker(s) 1110 and may utilize speaker(s) of an external or peripheral device to output audio via the speaker(s) of the external/peripheral device. In this example, the voice-controlled device 102 might represent a set-top box (STB), and the device 102 may utilize speaker(s) of an accessory device 104 such as a television that is connected to the STB for output of audio via the external speakers. In other examples, the voice-controlled device 102 may not include the microphone(s) 1102, and instead, the voice-controlled device 102 can utilize microphone(s) of an external or peripheral device to capture audio and/or generate audio data. In this example, the voice-controlled device 102 may utilize microphone(s) of a headset that is coupled (wired or wirelessly) to the voice-controlled device 102. These types of devices are provided by way of example and are not intended to be limiting, as the techniques described in this disclosure may be used in essentially any device that has an ability to recognize speech input or other types of natural language input.

Each of these devices 102 and 104 of FIGS. 11 and 12 may include one or more controllers/processors 1112 and 1204, that may include a central processing unit (CPU) for processing data and computer-readable instructions, and memory 1114 and 1206 for storing data and instructions of the respective device 102 and 104. Each device 102 and 104 may also be connected to removable or external non-volatile memory and/or storage, such as a removable memory card, memory key drive, networked storage, etc., through respective input/output device interfaces 1116 and 1202.

Computer instructions for operating each device 102 and 104 and its various components may be executed by the respective device's controller(s)/processor(s) 1112 and 1204, using the memory 1114 and 1206 as temporary "working" storage at runtime. A device's computer instructions may be stored in a non-transitory manner in non-volatile memory 1114 and 1206, storage 1118 and 1208, or an external device(s). Alternatively, some or all of the executable instructions may be embedded in hardware or firmware on the respective device 102 and 104 in addition to or instead of software.

Each device 102 and 104 includes input/output device interfaces 1116 and 1202. A variety of components may be connected through the input/output device interfaces 1116 and 1202. Additionally, each device 102 and 104 may include an address/data bus 1120 and 1210 for conveying data among components of the respective device. Each component within a device 102 and 104 may also be directly connected to other components in addition to, or instead of, being connected to other components across the bus 1120 and 1210.

The devices 102 and 104 may each include a display 1106 and 1212, which may comprise a touch interface 1108 and 1214. In other examples, the device 102 may not include a display and the accessory device 104 may include the display 1212. Any suitable display technology, such as liquid crystal display (LCD), organic light emitting diode (OLED), electrophoretic, and so on, may be utilized for the displays 1106 and 1212. Furthermore, the processor(s) 1112 and 1204 may comprise graphics processors for driving animation and video output on the associated displays 1106 and 1212, or the device 102 and 104 may be "headless" and may primarily rely on spoken commands for input. As a way of indicating to a user that a connection between another device has been opened, the device 102 and 104 may be configured with one or more visual indicators, such as the light source(s) 1216, which may also be described as light elements, of the accessory device 104, which may be in the form of LED(s) or similar components (not illustrated), that may change color, flash, or otherwise provide visible light output, such as for a light show on the accessory device 104, or a notification indicator on the device 102 and 104. The input/output device interfaces 1116 and 1202 that connect to a variety of components such as an audio output component such as a speaker 1110 and 1218 for outputting audio (e.g., audio corresponding to audio content, a text-to-speech (TTS) response, etc.), a wired headset or a wireless headset or other component capable of outputting audio. A wired or a wireless audio and/or video port may allow for input/output of audio/video to/from the device 102 and 104. The device 102 and 104 may also include an audio capture component. The audio capture component may be, for example, a microphone 1102 and 1220 or array of microphones, a wired headset or a wireless headset, etc. The microphone 1102 and 1220 may be configured to capture audio. If an array of microphones is included, approximate distance to a sound's point of origin may be determined using acoustic localization based on time and amplitude differences between sounds captured by different microphones of the array. The device 102 (using microphone 1102, wakeword detection module 1122, ASR module 1124, etc.) may be configured to generate audio data corresponding to captured audio. The device 102 (using input/output device interfaces 1116, antenna 1104, etc.) may also be configured to transmit the audio data to the remote system 138 for further processing or to process the data using internal components such as a wakeword detection module 1122. In some configurations, the accessory device 104 may be similarly configured to generate and transmit audio data corresponding to audio detected by the microphone(s) 1220.

Via the antenna(s) 1104 and 1222, the input/output device interfaces 1116 and 1202 may connect to one or more networks 136 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Universal Serial Bus (USB) connections may also be supported. Power may be provided to the devices 102 and 104 via wired connection to an external alternating current (AC) outlet, and/or via onboard power sources, such as batteries, solar panels, etc.

Through the network(s) 136, the speech processing system may be distributed across a networked environment. Accordingly, the device 102 and/or the remote system 138 may include an ASR module 1124. The ASR module 1124 of device 102 may be of limited or extended capabilities. The ASR module 1124 may include language models stored in ASR model storage component, and an ASR module 1124 that performs automatic speech recognition. If limited speech recognition is included, the ASR module 1124 may be configured to identify a limited number of words, such as keywords detected by the device, whereas extended speech recognition may be configured to recognize a much larger range of words.

The device 102 and/or the remote system 138 may include a limited or extended NLU module 1126. The NLU module 1126 of device 102 may be of limited or extended capabilities. The NLU module 1126 may comprise a name entity recognition module, an intent classification module and/or other components. The NLU module 1126 may also include a stored knowledge base and/or entity library, or those storages may be separately located.

The device 102 and/or the remote system 138 may also include a command processor 1128 that is configured to execute commands/functions associated with a spoken command as described herein. For example, the command processor 1128 may be configured to set a timer associated with a spoken command to set a timer via the device 102.

The device 102 may include a wakeword detection module 1122, which may be a separate component or may be included in an ASR module 1124. The wakeword detection module 1122 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred.

With reference again to the accessory device 104 of FIG. 12, the accessory device 104 may include a housing and/or base member. The shape of the housing may be, for example, a sphere, a cube, a pyramid, a cone, or any suitable three-dimensional shape. In examples, the housing may be shaped as a cylinder such that the housing resembles a wall clock. In other examples, the housing may resemble an egg timer, a digital clock, and/or a toy configured to display the passage of time. The accessory device 104 may include movable or actuating (e.g., pivoting, translating, rotating, etc.) members that operate in accordance with control signals received from the voice-controlled device 102. For example, the accessory device 104 may be configured to illustrate the passage of time given a theme of the device, such as a caricature of a mountain climber climbing to the top of a mounting, a ball dropping slowly similar to the start of a new year, a toy train travelling around a track. The accessory device 104 may include one or multiple motors 1224 for use in actuating such movable members. In this sense, the accessory device 104 may be utilized to physically show the passage of time, such as via a timer set by the user issuing voice commands to the voice-controlled device 102, and the voice-controlled device 102 responding by controlling the operation of the accessory device's 104 various components.

The accessory device 104 may be configured (e.g., with computer-executable instructions stored in the memory 1206) to select, or toggle, between multiple available modes based on commands (or instructions) received from the remote system 138 (in some cases, via the voice-controlled device 102), or based on user input received at the accessory device 104 itself and/or a personal device, such as the personal device 106 from FIG. 1. For example, the user can ask the voice-controlled device 102 to set the accessory device 104 in a particular mode of operation, such as a clock mode, a timer mode, etc., among multiple available modes of operation, and the accessory device 104 may select the particular mode to cause various components, such as the light source(s) 1216, the display 1212, etc.) to operate in a particular manner based on the selected mode of operation.

A camera 1226 can be mounted on the accessory device 104 and utilized for purposes like facial recognition and determining the presence or absence of a user in the vicinity of the accessory device 104 based on movement detection algorithms, etc. The camera 1226 may also be used for locating the user when the user emits an audio utterance in the vicinity of the accessory device 104. Alternative methods, such as echo-location and triangulation approaches, can also be used to locate the user in the room.

The accessory device 104 may include additional sensors 1228 for various purposes, such as accelerometers for movement detection, temperature sensors (e.g., to issue warnings/notifications to users in the vicinity of the accessory, and other types of sensors 1228. A global positioning sensor (GPS) 1230 may be utilized for location determination of the accessory device 104.

Offline mode may cause the accessory device 104 to operate according to a subset of operations stored in local memory of the accessory device 104. This may be useful in situations where the accessory device 104 is not connected to a network, such as a WiFi network, such as if the user takes the accessory device 104 on a road trip and the accessory device 104 is outside of an available network coverage areas. A push button on the housing of the accessory device 104, or a soft button on a touch screen of the display 1212, may allow for the user to easily engage the offline mode of the accessory device 104, such as when the voice-controlled device 102 is unavailable or powered off.

The setup mode may allow the user to configure the accessory device 104, and the accessory device 104 may demonstrate various ones of the available modes of operation during the setup mode. Set-up of the accessory device 104 may be substantially "low-friction" in the sense that it is not overly complicated and does not require that the user interact with the accessory device 104 at all, other than powering the accessory device 104 on, thereby allowing the user to enjoy the accessory device 104 quickly upon purchase. A companion application can be installed on a mobile device of the user to interface with the accessory device 104, such as to set-up the accessory. Such a companion application on a mobile device of the user can also be used for messaging mode of the accessory device 104, such as to send a message that is output, such as, displayed, output via audio on speakers, etc., of the accessory device 104. For instance, a parent, guardian, or friend connected to the same account of the user may send message data via the companion application to be output through the output means of the accessory device 104. Upon receipt of message data, the accessory device 104 may provide a notification of the received message, such as activation of a light source(s) 1216, presenting a message icon on the display 1212, etc., and may wait to playback the message data until the user requests playback of the message, such as via a voice command. Content may be updated at multiple different times, such as periodically, in response to a trigger event, etc., on the accessory device 104 via the wireless interface of the accessory device 104. In examples, parental consent may be enabled for the accessory device 104 to restrict the accessory device 104 from performing particular operations when a minor or child is detected via unique voice identification. The user may customize colors of the light sources 1216, voices for TTS output via the accessory device 104, and other customizable features in the setup mode.

The memory 1206 of the accessory device 104 may store computer-executable instructions that, when executed by the controller(s)/processor(s) 1204, cause the accessory device 104 to discover other accessory devices 104 registered to the user. The accessory device 104 may be configured to publish an identifier, such as an IP address, for this purpose that is sent to the remote system 114, and each accessory may receive identifiers of all other accessories registered to the user from the remote system 114. In this manner, accessory devices 104 may recognize each other and perform in a synchronized or meaningful way. Any suitable network protocol, such as UPnP, may be utilized to connect devices in this manner. Devices can also communicate using high frequency, such as a frequency inaudible to humans, tones and a modulator-demodulator algorithm to transmit data over audio.

Computer-executable instructions may be stored in the memory 1206 of the accessory device 104 that, when executed by the controller(s)/processor(s) 1204, cause various components of the accessory device 104 to operate in a synchronized manner (i.e., in coordination) with audio output via speakers of the voice-controlled device 102 and/or via speakers of the accessory device 104. For example, accessory device 104 may be configured to process control information that it receives from the remote system 138, possibly routed through the device 102, and which is associated with an audio file or other TTS data that is to be output as synthesized speech output. In this manner, the accessory device 104 may display digital animations on the display 1212, operate the light sources 1216, and/or actuate movable members of the accessory device 104 in synchronization with the audio corresponding to, for example, an audio file, timer data file, TTS response, etc. Accordingly, the accessory device 104 may receive the control information, possibly along with the associated audio data. The control information can include, without limitation, timer data.

For time synchronization, the accessory device 104 may include a clock 1232 that may be referenced and correlated with clocks of other devices, such as other accessory device 104, voice-controlled devices 102, etc., via offset and skew parameters to allow the accessory device 104 to maintain synchronization with other accessory devices 104 and/or with the device 102, such as when a group of accessory devices 104 displays the same timer and/or amount of time associated with a timer, or when the accessory device 104 is to operate in a synchronized manner with timer output by the device 102. For instance, the device 102 may utilize an accessory communication module 1130 to send time synchronization information, such as timestamps, to the accessory device 104, and the accessory device 104 may return time synchronization information to the device 102, which may be used to calculate offset and skew parameters so that respective clocks of the devices 102 and 104 (or clocks of multiple accessory devices 104) can be synchronized so that operation of the accessory device 104 and the device 102 can be synchronized. The clock 1232 may also be used as a timer that, when expired, can emit a character specific sound to act as an alarm clock, a kitchen timer, etc. The accessory communication module 1130 may further be utilized by the device 102 to communicate any suitable information and data to the accessory device 104, such as the forwarding of a second instruction and second information, and/or forwarding of control information and/or supplemental content to the accessory device 104, such as when the device 102 acts as a pass-through device that obtains information from the remote system 138 and sends the information to the accessory device 104. In examples, when the user device 102 sends instructions to present a visual display of a timer on the accessory device 104, the instructions may be sent via the data layer, and in some examples the serial port profile, of the Bluetooth protocol. Additionally, or alternatively, data may be sent to and/or from the device 102 and/or the accessory device 104 via Bluetooth Low Energy (BLE), which is a wireless personal area network. Utilizing BLE may reduce power consumption via the device 102 and/or the accessory device 104.

Figure 13:
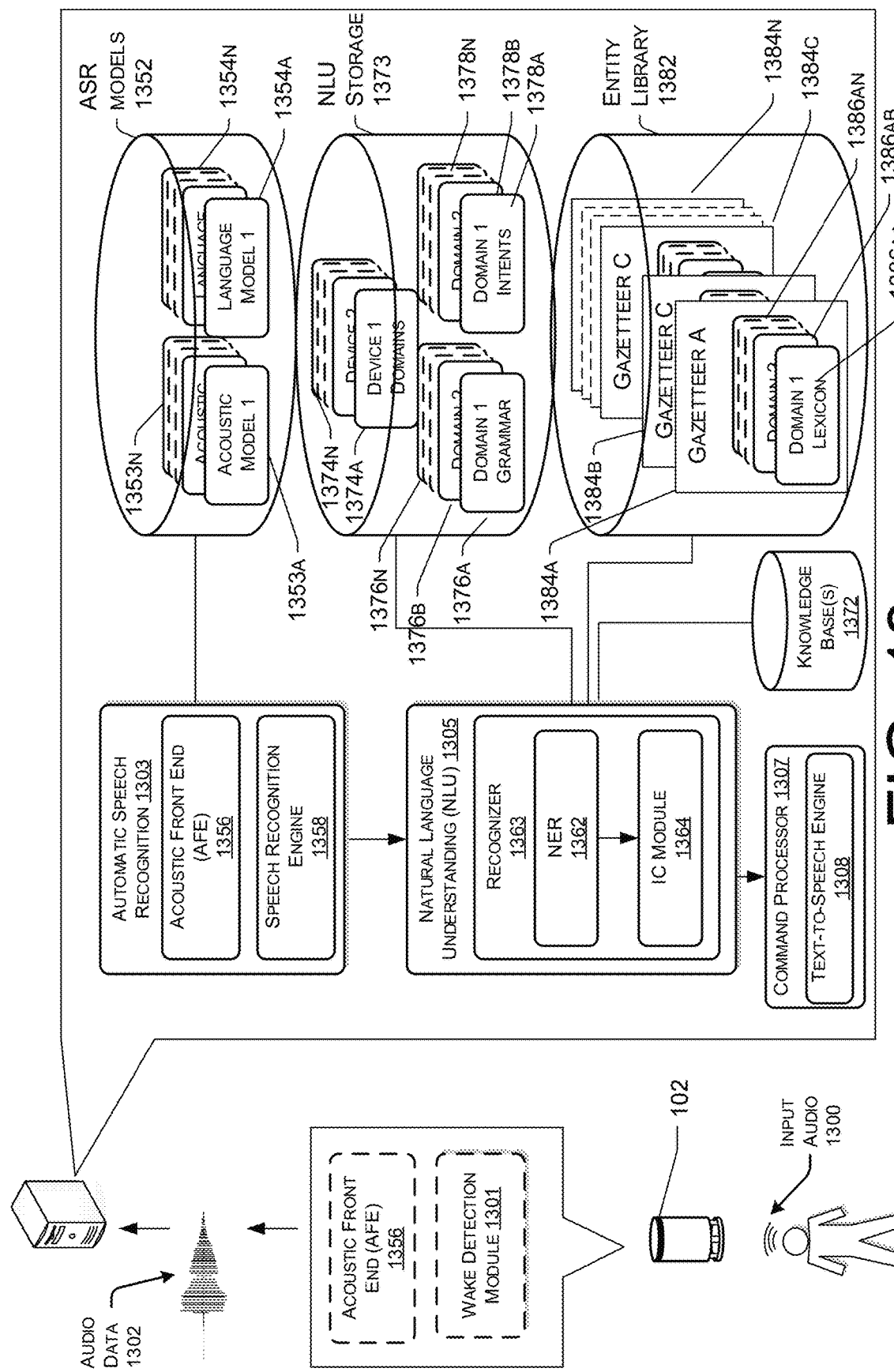
FIG. 13 illustrates a conceptual diagram of components of a speech processing system for processing audio data provided by one or more devices.

FIG. 13 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 138). The various components illustrated may be located on a same or different physical devices. Communication between various components illustrated in FIG. 13 may occur directly or across a network 136. An audio capture component, such as a microphone 112 of the device 102, or another device, captures audio 1300 corresponding to a spoken utterance. The device 102 or 106, using a wakeword detection module 1301, then processes audio data corresponding to the audio 1300 to determine if a keyword (such as a wakeword) is detected in the audio data. Following detection of a wakeword, the device 102 or 106 sends audio data 1302 corresponding to the utterance to the remote system 138 that includes an ASR module 1303. The audio data 1302 may be output from an optional acoustic front end (AFE) 1356 located on the device prior to transmission. In other instances, the audio data 1302 may be in a different form for processing by a remote AFE 1356, such as the AFE 1356 located with the ASR module 1303 of the remote system 138.

The wakeword detection module 1301 works in conjunction with other components of the user device, for example a microphone to detect keywords in audio 1300. For example, the device may convert audio 1300 into audio data, and process the audio data with the wakeword detection module 1301 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wakeword detection module 1301 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 1301 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 1302 corresponding to input audio 1300 to the remote system 138 for speech processing. Audio data corresponding to that audio may be sent to remote system 138 for routing to a recipient device or may be sent to the remote system 138 for speech processing for interpretation of the included speech (either for purposes of enabling voice-communications and/or for purposes of executing a command in the speech). The audio data 1302 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 138, an ASR module 1303 may convert the audio data 1302 into text. The ASR transcribes audio data into text data representing the words of the speech contained in the audio data 1302. The text data may then be used by other components for various purposes, such as executing system commands, inputting data, etc. A spoken utterance in the audio data is input to a processor configured to perform ASR which then interprets the utterance based on the similarity between the utterance and pre-established language models 1354 stored in an ASR model knowledge base (ASR Models Storage 1352). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1353 stored in an ASR Models Storage 1352), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 1303 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1356 and a speech recognition engine 1358. The acoustic front end (AFE) 1356 transforms the audio data from the microphone into data for processing by the speech recognition engine 1358. The speech recognition engine 1358 compares the speech recognition data with acoustic models 1353, language models 1354, and other data models and information for recognizing the speech conveyed in the audio data. The AFE 1356 may reduce noise in the audio data and divide the digitized audio data into frames representing time intervals for which the AFE 1356 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1358 may process the output from the AFE 1356 with reference to information stored in speech/model storage (1352). Alternatively, post front-end processed data (such as feature vectors) may be received by the device executing ASR processing from another source besides the internal AFE. For example, the user device may process audio data into feature vectors (for example using an on-device AFE 1356) and transmit that information to a server across a network for ASR processing. Feature vectors may arrive at the remote system 138 encoded, in which case they may be decoded prior to processing by the processor executing the speech recognition engine 1358.

The speech recognition engine 1358 attempts to match received feature vectors to language phonemes and words as known in the stored acoustic models 1353 and language models 1354. The speech recognition engine 1358 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, set timer for 10 minutes" or "Alexa, set another timer for 20 minutes." The wake detection module may identify the wake word, otherwise described as a trigger expression, "Alexa," in the user utterance and may "wake" based on identifying the wake word. Audio data corresponding to the user utterance may be sent to the remote system 138, where the speech recognition engine 1358 may identify, determine, and/or generate text data corresponding to the user utterance, here "set timer for 10 minutes" or "set another timer for 20 minutes."

The speech recognition engine 1358 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1358 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 138, for natural language understanding (NLU) processing, such as conversion of the text into commands for execution, either by the user device, by the remote system 138, or by another device (such as a server running a specific application like a search engine, etc.).

The device performing NLU processing 1305 (e.g., server 138) may include various components, including potentially dedicated processor(s), memory, storage, etc. As shown in FIG. 13, an NLU component 1305 may include a recognizer 1363 that includes a named entity recognition (NER) module 1362 which is used to identify portions of query text that correspond to a named entity that may be recognizable by the system. A downstream process called named entity resolution links a text portion to a specific entity known to the system. To perform named entity resolution, the system may utilize gazetteer information (1384*a*-1384*n*) stored in entity library storage 1382. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from ASR 1303 based on the utterance input audio 1300) and attempts to make a semantic interpretation of the text. That is, the NLU process determines the meaning behind the text based on the individual words and then implements that meaning. NLU processing 1305 interprets a text string to derive an intent or a desired action from the user as well as the pertinent pieces of information in the text that allow a device (e.g., device 102) to complete that action. For example, if a spoken utterance is processed using ASR 1303 and outputs the text "add music to the kitchen" the NLU process may determine that the user intended for the audio being output by a device also be output by another device associated with the identifier of kitchen.

The NLU may process several textual inputs related to the same utterance. For example, if the ASR 1303 outputs N text segments (as part of an N-best list), the NLU may process all N outputs to obtain NLU results.

As will be discussed further below, the NLU process may be configured to parse and tag to annotate text as part of NLU processing. For example, for the text "set a timer for 10 minutes," "set timer" may be tagged as a command (to output audio on a device) and "10 minutes" may be tagged as the amount of time to set the timer for.

To correctly perform NLU processing of speech input, an NLU process 1305 may be configured to determine a "domain" of the utterance so as to determine and narrow down which services offered by the endpoint device (e.g., remote system 138 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 1362 receives a query in the form of ASR results and attempts to identify relevant grammars and lexical information that may be used to construe meaning. To do so, the NLU module 1305 may begin by identifying potential domains that may relate to the received query. The NLU storage 1373 includes a database of devices (1374a-1374n) identifying domains associated with specific devices. For example, the user device may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 1363, language model and/or grammar database (1376a-1376n), a particular set of intents/actions (1378a-1378n), and a particular personalized lexicon (1386). Each gazetteer (1384a-1384n) may include domain-indexed lexical information associated with a particular user and/or device. For example, the Gazetteer A (1384a) includes domain-index lexical information 1386aa to 1386an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains ordinarily selected to be the correct result.

An intent classification (IC) module 1364 parses the query to determine an intent or intents for each identified domain, where the intent corresponds to the action to be performed that is responsive to the query. Each domain is associated with a database (1378a-1378n) of words linked to intents. For example, a music intent database may link words and phrases such as "quiet," "volume off," and "mute" to a "mute" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC module 1364 identifies potential intents for each identified domain by comparing words in the query to the words and phrases in the intents database 1378. In some instances, the determination of an intent by the IC module 1364 is performed using a set of rules or templates that are processed against the incoming text to identify a matching intent.

In order to generate a particular interpreted response, the NER 1362 applies the grammar models and lexical information associated with the respective domain to actually recognize a mention of one or more entities in the text of the query. In this manner, the NER 1362 identifies "slots" or values (i.e., particular words in query text) that may be needed for later command processing. Depending on the complexity of the NER 1362, it may also label each slot with a type of varying levels of specificity (such as noun, place, city, artist name, song name, amount of time, timer number, or the like). Each grammar model 1376 includes the names of entities (i.e., nouns) commonly found in speech about the particular domain (i.e., generic terms), whereas the lexical information 1386 from the gazetteer 1384 is personalized to the user(s) and/or the device. For instance, a grammar model associated with the shopping domain may include a database of words commonly used when people discuss shopping.

The intents identified by the IC module 1364 are linked to domain-specific grammar frameworks (included in 1376) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "set a timer" is an identified intent, a grammar (1376) framework or frameworks may correspond to sentence structures such as "set a timer for {amount of time}" and/or "timer for {amount of time}."

For example, the NER module 1362 may parse the query to identify words as subject, object, verb, preposition, etc., based on grammar rules and/or models, prior to recognizing named entities. The identified verb may be used by the IC module 1364 to identify intent, which is then used by the NER module 1362 to identify frameworks. A framework for the intent of "play a song," meanwhile, may specify a list of slots/fields applicable to play the identified "song" and any object modifier (e.g., specifying a music collection from which the song should be accessed) or the like. The NER module 1362 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER module 1362 may search the database of generic words associated with the domain (in the knowledge base 1372). So, for instance, if the query was "set a timer for 600 seconds," after failing to determine the amount of time to set the timer for, the NER component 1362 may search the domain vocabulary for the phrase "600 seconds." In the alternative, generic words may be checked before the gazetteer information, or both may be tried, potentially producing two different results.

The output data from the NLU processing (which may include tagged text, commands, etc.) may then be sent to a command processor 1307. The destination command processor 1307 may be determined based on the NLU output. For example, if the NLU output includes a command to send a message, the destination command processor 1307 may be a message sending application, such as one located on the user device or in a message sending appliance, configured to execute a message sending command. If the NLU output includes a search request, the destination command processor 1307 may include a search engine processor, such as one located on a search server, configured to execute a search command. After the appropriate command is generated based on the intent of the user, the command processor 1307 may provide some or all of this information to a text-to-speech (TTS) engine 1308. The TTS engine 1308 may then generate an actual audio file for outputting the audio data determined by the command processor 1307 (e.g., "timer set for 10 minutes," or "first timer set"). After generating the file (or "audio data"), the TTS engine 1307 may provide this data back to the remote system 138.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 1305 during runtime operations where NLU operations are performed on text (such as text output from an ASR component 1303). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1363. Each recognizer may include various NLU components such as an NER component 1362, IC module 1364 and other components such as an entity resolver, or other components.

For example, a messaging domain recognizer 1363-A (Domain A) may have an NER component 1362-A that identifies what slots (i.e., portions of input text) may correspond to particular words relevant to that domain. The words may correspond to entities such as (for the messaging domain) a recipient. An NER component 1362 may use a machine learning model, such as a domain specific conditional random field (CRF) to both identify the portions corresponding to an entity as well as identify what type of entity corresponds to the text portion. The messaging domain recognizer 1363-A may also have its own intent classification (IC) component 1364-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 138 may include a model training component. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the user device and the remote system 138, as illustrated herein are exemplary, and may be located in a stand-alone device or may be included, in whole or in part, as a component of a larger device or system, may be distributed across a network or multiple devices connected by a network, etc.

Figure 14:
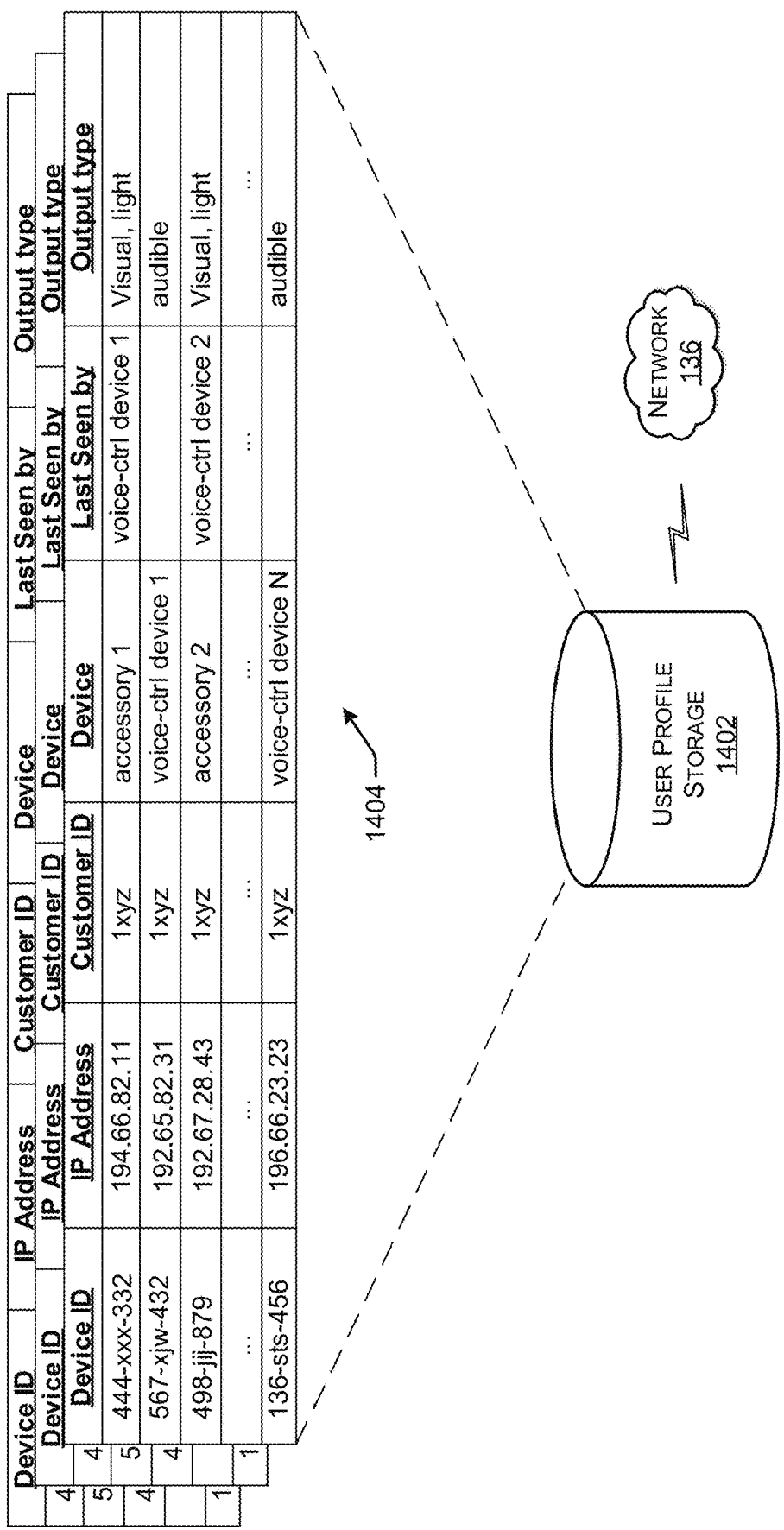
FIG. 14 illustrates a user profile storage that includes data regarding user profiles.

FIG. 14 illustrates a user profile storage 1402 that includes data regarding user profiles 1404. The user profile storage 1402 may be part of, or proximate to, the remote system 138, or may otherwise be in communication with various components, for example over the network 136. The user profile storage 1402 may include a variety of information related to individual users, accounts, etc. that interact with the device 102, the one or more accessory devices 104, and/or the remote system 138. For illustration, as shown in FIG. 14, the user profile storage 1402 may include data regarding the devices associated with particular individual user profiles 1404. In an example, the user profile storage 1402 is a cloud-based storage. Such data may include device identifier (ID) and internet protocol (IP) address information for different devices as well as names by which the devices may be referred to by a user. Further qualifiers describing the devices may also be listed along with a description of the type of object of the device.

A particular user profile 1404 may include a variety of data that may be used by the system. For example, a user profile may include information about what accessory devices 104 are associated with the user and/or the user device 102. The profile 1404 may include, for accessory devices 104, a voice-controlled device 102 by which the accessory was "last seen." In this manner, in instances where the user moves an accessory device 104 about an environment, such as from the kitchen to a bedroom, that includes multiple voice-controlled devices 102, the accessory device 104 can wirelessly pair with a closest voice-controlled device 102 in proximity to the accessory device 104 and this information can be sent to the remote system 138 to dynamically update the profile 1404 with the voice-controlled device 102 that was last paired with the accessory 104. This accessory-to-device association can be dynamically updated as locations of the devices 102 and 104 change within the environment. Furthermore, the remote system 138 can use these accessory-to-device associations to determine which devices to send information and instructions to in order to coordinate the operation of an accessory 104 with an appropriate voice-controlled device 102. The profile 1404 may also include information about how a particular accessory 104 may operate (e.g., display output, light source operation, animatronic movement, audio output, etc.). A user profile 1404 may also contain a variety of information that may be used to check conditional statements such as address information, contact information, default settings, device IDs, user preferences, or the like.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
    a housing having physical demarcations of units of time, the housing being configured to be removably couplable to a wall;
    light emitting diodes (LEDs) coupled to the housing, wherein the LEDs are physically positioned on the housing such that a LED of the LEDs represents a minute of time;
    a first moveable member representing an hour hand;
    a second moveable member representing a minute hand;
    one or more processors; and
    computer-readable media storing computer-executable instructions that, when executed by the one or more processors, cause the one or more processors to perform operations comprising:
        establishing a communication channel with a voice-controlled device;
        receiving, via the communication channel and from the voice-controlled device, first timer data indicating that a first timer has been set via the voice-controlled device;
        receiving, via the communication channel and from the voice-controlled device, second timer data indicating that a second timer has been set via the voice-controlled device, the second timer being set prior to lapsing of the first timer such that the second timer and the first timer run concurrently; and
        causing a first LED of the LEDs to emit light, the first LED corresponding to a first number of minutes associated with the first timer;
        causing a second LED of the LEDS to emit light, the second LED corresponding to a second number of minutes associated with the second timer.

2. The system of claim 1, wherein the second LED is caused to emit the light at a differing of at least one of an intensity or a color from the first LED.

3. The system of claim 1, the system further comprising a touchscreen, and the operations further comprising:
    receiving user input via the touchscreen, the user input comprising a selection of a portion of the LEDs and the user input indicating setting a third timer via the touchscreen; and
    sending, to the voice-controlled device, input data indicating the third timer has been set.

4. A method, comprising:
    receiving, at a device and from a voice-controlled device, first timer data indicating that a first timer has been set, the first timer data indicating a first amount of time, the device configured to display time;
    causing, on the device and based at least in part on receiving the first timer data, a first light element associated with the device to emit first light, the first light element representing the first amount of time;
    receiving second timer data indicating that a second timer has been set, the second timer data being a second amount of time that overlaps at least in part with the first amount of time such that the first timer and the second timer run, at least in part, concurrently; and
    causing a second light element to emit second light, the second light representing the second amount of time.

5. The method of claim 4, wherein the first light element is associated with a first time indicator, and the method further comprises:
    causing the first light element to cease emitting the first light based at least in part on a portion of the first amount of time lapsing; and
    causing a third light element associated with a second time indicator to emit third light based at least in part on the portion of the first amount of time lapsing.

6. The method of claim 4, wherein:
    causing the first light element to emit the first light comprises causing the first light element to emit the first light at a first intensity; and
    causing the second light element to emit the second light comprises causing second the second light element to emit the second light at a second intensity, the first intensity differing from the second intensity.

7. The method of claim 4, wherein:
    causing the first light element to emit the first light comprises causing the first light element to emit the first light at a first color; and
    causing the second light element to emit the second light comprises causing the second light element to emit the second light at a second color, the first color differing from the second color.

8. The method of claim 4, the operations further comprising:
    receiving user input via a touchscreen of the device, the user input comprising a selection of the second light element and the user input indicating setting the second timer via the touchscreen; and
    sending, to the voice-controlled device, input data indicating the second timer has been set.

9. The method of claim 4, wherein:
    light elements of the device are positioned in a circular arrangement with respect to the device; and
    the first light element corresponds to a number of minutes of the first amount of time.

10. The method of claim 4, further comprising:
    identifying a position of a minute hand of the device; and identifying a number of minutes corresponding to the amount of time, wherein the first light element is based at least in part on the number of minutes.

11. The method of claim 4, wherein the device comprises a first device, and the method further comprises causing a second device to display at least one of the first timer or the second timer based at least in part on user account data indicating that the second device is associated with the first device.

12. The method of claim 4, wherein the device comprises a first device, and the method further comprises causing a second device to display at least one of the first timer or the second timer based at least in part on detection of user presence by the second device.

13. The method of claim 4, wherein the first light element indicates a first minute representation on a clock face of the device and the second light element indicates a second minute representation on the clock face of the device.

14. A system, comprising:
one or more processors; and
computer-readable media storing computer-executable instructions that, when executed by the one or more processors, cause the one or more processors to perform operations comprising:
receiving, at a device and from a voice-controlled device, first timer data indicating that a first timer has been set, the first timer data indicating a first amount of time, the device configured to display time;
causing, on the device and based at least in part on receiving the first timer data, a first light element associated with the device to emit first light, the first light element representing the first amount of time;
receiving second timer data indicating that a second timer has been set while the first timer is running, the second timer data being received during the first amount of time and indicating a second amount of time; and
causing a second light element to emit second light, the second light representing the second amount of time.

15. The system of claim 14, wherein the first light element is associated with a first time indicator, and the operations further comprising:

causing the first light element to cease emitting the first light based at least in part on a portion of the first amount of time lapsing; and
causing a third light element associated with a second time indicator to emit third light based at least in part on the portion of the amount of time lapsing.

16. The system of claim 14, wherein:
causing the first light element to emit the first light comprises causing the first light element to emit the first light at a first intensity; and
wherein causing the second light element to emit the second light comprises causing second the second light element to emit the second light at a second intensity, the first intensity differing from the second intensity.

17. The system of claim 14, wherein:
causing the first light element to emit the first light comprises causing the first light element to emit the first light at a first color; and
causing the second light element to emit the second light comprises causing the second light element to emit the second light at a second color, the first color differing from the second color.

18. The system of claim 14, the operations further comprising:
receiving user input via a touchscreen of the device, the user input comprising a selection of the second light element and the user input indicating setting the second timer via the touchscreen; and
sending, to the voice-controlled device, input data indicating the second timer has been set.

19. The system of claim 14, wherein:
light elements of the device are positioned in a circular arrangement with respect to the device; and
the first light element corresponds to a minute representation on the device.

20. The system of claim 14, the operations further comprising:
identifying a position of a minute hand of the device; and
identifying a number of minutes corresponding to the first amount of time, wherein the first light element is based at least in part on the number of minutes.

* * * * *